United States Patent
Murjani et al.

(10) Patent No.: US 12,468,696 B1
(45) Date of Patent: Nov. 11, 2025

(54) SIGNAL EVALUATION PLATFORM

(71) Applicant: ExlService Holdings, Inc., New York, NY (US)

(72) Inventors: Suresh Murjani, Jodhpur (IN); Prashant Poddar, Noida (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/245,148

(22) Filed: Jun. 20, 2025

(51) Int. Cl.
G06F 7/00 (2006.01)
*G06F 16/242* (2019.01)
*G06F 16/248* (2019.01)

(52) U.S. Cl.
CPC .......... *G06F 16/243* (2019.01); *G06F 16/248* (2019.01)

(58) Field of Classification Search
CPC .... G06F 16/245; G06F 16/243; G06F 16/248; G06F 16/287; G06F 16/288; G06F 16/9024; G06F 16/2477; G06F 16/2428; G06F 16/9558; G06F 16/9535; G06F 16/3344; G06F 16/2425; G06F 16/2455; G06F 16/24578; G06F 16/14; G06F 16/38; G06F 16/24566; G06F 16/24522; G06F 11/302; G06F 11/3041; G06F 11/3624; G06F 8/10; G06F 8/60; G06F 8/71; G06F 8/73
See application file for complete search history.

(56) References Cited

U.S. PATENT DOCUMENTS

| | | | |
|---|---|---|---|
| 11,321,064 B1* | 5/2022 | Frey | G06F 21/64 |
| 2015/0154020 A1* | 6/2015 | Lior | G06F 8/33 |
| | | | 717/122 |
| 2019/0026661 A1* | 1/2019 | Cortell | G06Q 10/06393 |
| 2020/0352518 A1* | 11/2020 | Lyman | A61B 6/5258 |
| 2022/0253744 A1* | 8/2022 | Sloane | G06F 18/24 |
| 2023/0297482 A1* | 9/2023 | Entin | G06F 30/00 |
| | | | 710/16 |

* cited by examiner

*Primary Examiner* — Mohammad A Sana
(74) *Attorney, Agent, or Firm* — Perkins Coie LLP

(57) ABSTRACT

Systems and methods are disclosed comprising techniques for signal evaluation, such as receiving a natural-language query for information associated with a first digital artifact set of a monitored system, retrieving a second digital artifact set mapped to the first digital artifact set, calculating a performance differential report indicating change in one or more operational performance characteristics from the first digital artifact set to the second digital artifact set, determining at least one historical dialogue record using the received natural-language query, causing a generative machine learning model to generate a narrative response to the received natural-language query using the calculated performance differential report and the at least one historical dialogue record, and transmitting the generated narrative response to the received natural-language query for display at a user interface.

20 Claims, 17 Drawing Sheets

Signal Evaluation Platform

- ≡ MENU
- 🔔 Notifications
- ← Home
- 📄 Reporting Schedule
- ⏳ Validations
- Differential Analysis
- Operation Informatics
- ♀ Generative Assistant
- Review Console
- 🏛 Query Repository
- 📊 Metrics
- 👤 John Doe

Reporting Schedule

Filters      Year [2023 ▾]    Year [Q4 ▾]

Statutory Reporting Schedule — 420

[Add Entity]   [Roll Forward]

410

| | Entity | Year | Period | Complexity | Analyst Status | Reviewer Status | Actions |
|---|---|---|---|---|---|---|---|
| ‹ | Group A | 2023 | Q4 | Low | Completed (Delay) | Completed (Delay) | 📝 |

430

| Analyst | Task Deadline | Completion Date | Reviewer | Review Deadline | Review Date | Review Status |
|---|---|---|---|---|---|---|
| Jane Doe | Jan 15, 2024 | Jan 15, 2024 | John Doe | Jan 17, 2024 | Jan 17, 2024 | |

Digital Artifact Records and Schedules

| Title | Task Deadline | Completion Date | Analyst Status | Review Deadline | Review Date | Review Status |
|---|---|---|---|---|---|---|
| Page – 2 to 5 | 04/25/2024 | 09/26/2024 | In Progress | 04/30/2024 | 09/20/2024 | In Progress |
| Underwriting and Investment Exhibits – Premiums, Losses, Expenses; Exhibit of Net Investment | 04/19/2024 | | Not Started | 04/21/2024 | | Not Started |

Validations

Filters — Entity: Group A | Year: 2023 | Year: Q4

[Total (38)] [Passed (19)] [Failed (19)] [Refresh]

Validation Details

| Validation No. | Explanation | Source | Comments | Status | Actions |
|---|---|---|---|---|---|
| Validation 9 | No negative written premium in Sch. F Part 1 | Facts Data | : | Failed | |
| Validation 10 | Reinsurers having assumed written premium should have either premium receivables or UEPR | Facts Data | : | Failed | |
| Validation 11 | Reinsurers having assumed written premium and receivables should have UEPR | Facts Data | : | Failed | |
| ... | | | | | |
| Validation 45 | Assets Page, Column 3, Line 16.1 divided by 1000 should equal to Schedule F, Part 3, Column 7 plus Column 8 Line 999999 | Third-Party | : | Failed | |
| Validation 46 | Assets Page, Column 3, Line 3.1 plus Line 3.2 should equal to Schedule B, Verification Between Years, Column 2, Line 15 | Third-Party | : | Failed | |
| Validation 47 | Statement of Income, Column 1, Line 1, should equal to Underwriting and Investment Exhibit, Premiums Earned, Column 4, Line 35 | Third-Party | : | Failed | |

Menu: Signal Evaluation Platform — Notifications, Home, Reporting Schedule, Validations, Differential Analysis, Operation Informatics, Generative Assistant, Review Console, Query Repository, Metrics, John Doe

*FIG. 5A*

Signal Evaluation Platform

Validations

Filters | Entity: Group A | Year: 2023 | Year: Q4

Validation Details / Validation 10 / Proposed Actions

Proposed Actions for Failed Validation

Reach out to reinsurance team to provide explanation for absence of unearned premium or assumed premium receivable MENU
- Notifications
- Home
- Reporting Schedule
- Validations
- Differential Analysis
- Operation Informatics
- Generative Assistant
- Review Console
- Query Repository
- Metrics
- John Doe

Signal Evaluation Platform

MENU
- Notifications
- Home
- Reporting Schedule
- Validations
- Differential Analysis
- Operation Informatics
- Generative Assistant
- Review Console
- Query Repository
- Metrics
- John Doe

Differential Analysis

Filters — Entity: Group A — Year: 2023 — Q4

Analysis — 620

| Statement Location | Line Description | Current Period | Prior Period | Factual Explanation | Narrative Explanation | Attachments | Actions |
|---|---|---|---|---|---|---|---|
| Income Statement | Premium Earned | $6,427 | $6,194 | Increase in premiums driven by enterprise expansion of business operations over previous year | Growth in enterprise resulting from economic, technological, and societal factors | Document Link | 📝 |
| Income Statement | Losses Incurred | $4,638 | $3,976 | Increase in loss incurred driven by increase in Net Incurred But Not Reported (IBNR) over previous year | Increase in losses resulting from natural events (hurricanes), accidents and rise in litigations | Document Link | 📝 |
| Income Statement | Losses Adjustment Expenses | $916 | $989 | Decrease in assumed Loss Adjustment Expenses (LAE) by approximately $90 million | Decrease in loss adjustment expenses reflecting efficiency of improved management practices | Document Link | 📝 |
| Income Statement | Other Underwrite | $2,056 | $2,010 | Increase in other underwriting attributed to increase in net commission by $60 million | Attributed to increase in business and rate of commission | Document Link | 📝 |

*FIG. 6*

Figure 7:
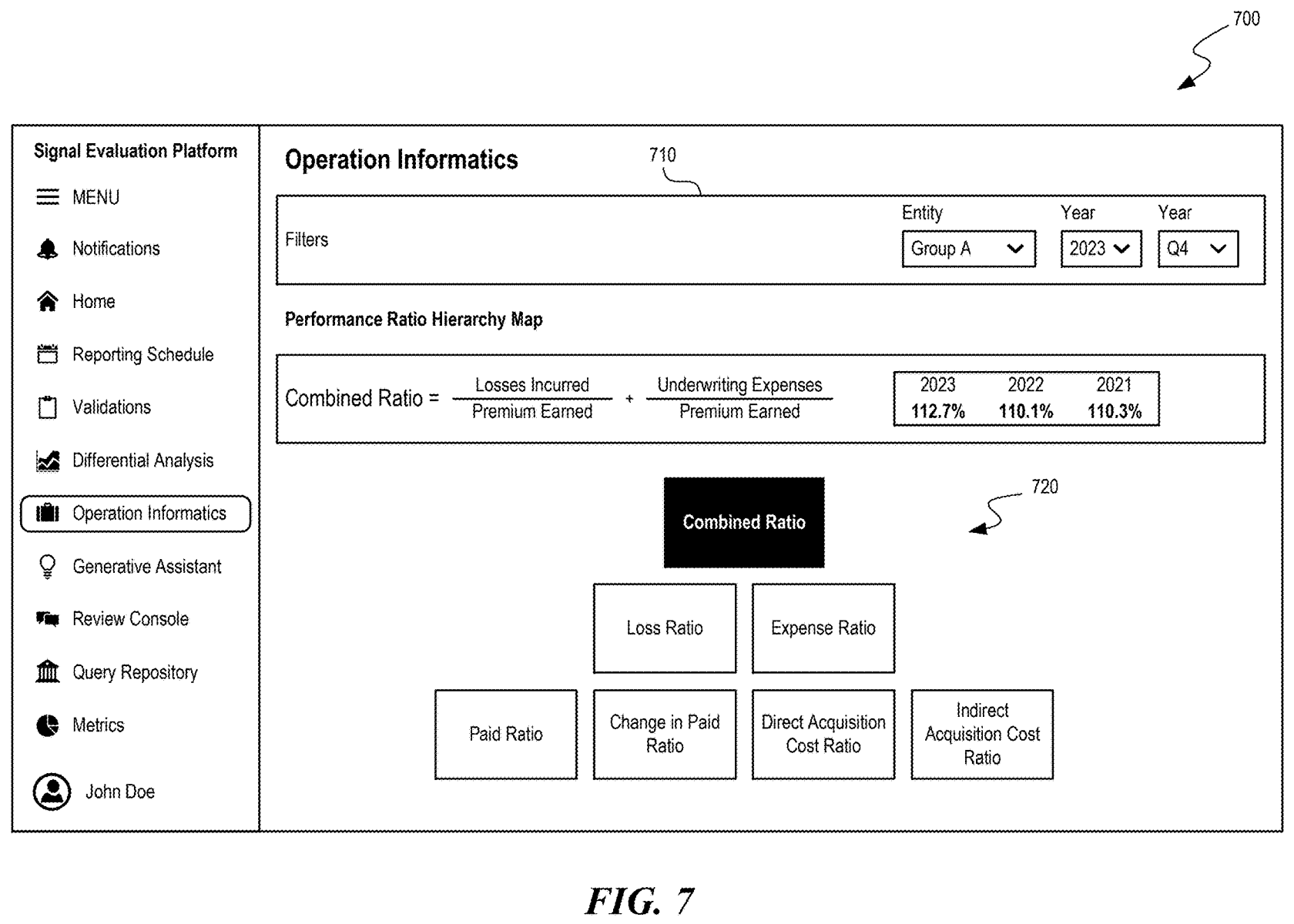

Operation Informatics

Filters

| Entity | Year | Year |
|---|---|---|
| Group A | 2023 | Q4 |

Performance Ratio Hierarchy Map — 710

$$\text{Combined Ratio} = \frac{\text{Losses Incurred}}{\text{Premium Earned}} + \frac{\text{Underwriting Expenses}}{\text{Premium Earned}}$$

| 2023 | 2022 | 2021 |
|---|---|---|
| 112.7% | 110.1% | 110.3% |

720

Combined Ratio

- Loss Ratio
- Expense Ratio
- Paid Ratio
- Change in Paid Ratio
- Direct Acquisition Cost Ratio
- Indirect Acquisition Cost Ratio

Signal Evaluation Platform

≡ MENU
- 🔔 Notifications
- ⬅ Home
- 📋 Reporting Schedule
- 🗂 Validations
- ⏳ Differential Analysis
- ⚙ Operation Informatics
- 💡 Generative Assistant
- 🖥 Review Console
- 🏛 Query Repository
- 📊 Metrics
- 👤 John Doe

Review Console

Filters

Entity: Group A | Year: 2023 | Year: Q4

Review Comments

[Create Comment]

| Title | Entity | Attachments | Controller | Analyst | Reported in KPIs | Status |
|---|---|---|---|---|---|---|
| Salary Expense for investment functions | Group A | View Attachments | John Doe | Jane Doe | Yes | Closed |
| Salary Expense for investments | Group A | View Attachments | John Doe | Jane Doe | No | Open |
| Salary Expenses | Group A | View Attachments | John Doe | John Doe | No | Open |
| Salary Expenses financial | Group A | View Attachments | John Doe | John Doe | No | Open |
| Salary Expenses for Reinsurance | Group A | View Attachments | John Doe | John Doe | No | Closed |

Signal Evaluation Platform

MENU
- Notifications
- Home
- Reporting Schedule
- Validations
- Differential Analysis
- Operation Informatics
- Generative Assistant
- Review Console
- Query Repository
- Metrics
- John Doe

*FIG. 9A*

Signal Evaluation Platform

≡ MENU

- Notifications
- Home
- Reporting Schedule
- Validations
- Differential Analysis
- Operation Informatics
- Generative Assistant
- [Review Console]
- Query Repository
- Metrics
- John Doe

Review Console

Create Comment

Title*
[Enter Title]                      0/1000

Entity*
[Group A ⌄]

Analyst
Jane Doe

Comments*
[Insert Comments]                  0/1000

Upload Files
[Upload]

[Create]

*FIG. 9B*

Signal Evaluation Platform

≡ MENU

🔔 Notifications

⬅ Home

🗂 Reporting Schedule

🗄 Validations

⧗ Differential Analysis

🛢 Operation Informatics

💡 Generative Assistant

🎙 Review Console

🏛 Query Repository

📊 Metrics

👤 John Doe

---

Query Repository ⟵ 1000

Filters

Entity: Group A ⌄     Year: 2023 ⌄     Year: Q4 ⌄

⟵ 1010

Queries ⟵ 1020

⟨ Uncollected Premiums and Agents' Balances in the Course of Collection decreased materially in 2023, and the balance as of year-end 2023 was significantly lower than the balance reported in the prior year. Please provide an explanation regarding the material decrease in this balance at December 31, 2021 as compared to prior years.

⎯⎯ The large decrease in the uncollected premiums and agent's balances is related to an early cutoff to meet group reporting deadlines, and the result improved collection efforts. ⎯⎯

⟩ Schedule Y – Part 2 of the Annual Statement indicated that $138.3 million was paid under management agreements and service contracts with affiliates. Schedule Y – Part 2 of the prior Annual Statement indicated that $164.2 million was paid for these services. Please provide an explanation for the significant decrease in this account.

⟩ The Enterprise's net loss ratio deteriorated from 68% at year-end 2022 to 85% at December 31, 2023. The 2021 MD&A attributed the increase in this ratio to net adverse development of $7.2M for prior accident years attributable to excess casualty book of business, primarily due to greater than expected loss emergency and a change in underlying actuarial assumptions. Please provide an explanation for the loss emergence development and change in underlying actuarial assumptions.

*FIG. 10*

SIGNAL EVALUATION PLATFORM

TECHNICAL FIELD

The present disclosure generally relates to systems and methods for natural-language processing (NLP). More particularly, the present disclosure relates to systems and methods for signal evaluation and processing using large language models (LLMs).

BACKGROUND

Machine learning (ML) is a field of study in artificial intelligence concerned with the development and study of statistical algorithms that can learn from data and generalize unseen data and thus perform tasks without explicit instructions. Within a subdiscipline in machine learning, advances in the field of deep learning have enabled neural networks, a class of statistical algorithms, to surpass many previous machine learning approaches in performance.

Natural-language processing is a subfield of computer science and especially artificial intelligence. It is primarily concerned with providing computers with the ability to process data encoded in natural-language and is thus closely related to information retrieval, knowledge representation and computational linguistics, a subfield of linguistics. A large language model is a type of machine learning model designed for natural-language processing tasks such as language generation. LLMs are language models with many parameters and are trained on a vast amount of text. One type of LLMs are generative pretrained transformers (GPTs).

BRIEF DESCRIPTION OF THE DRAWINGS

Detailed descriptions of implementations of the present invention will be described and explained through the use of the accompanying drawings.

FIG. 4 is a block diagram that illustrates an example graphical user interface that demonstrates aspects of a scheduling interface of the signal evaluation platform in accordance with some implementations of the present technology.

FIGS. 5A-C are block diagrams that illustrate an example graphical user interface that demonstrates aspects of a validation interface of the signal evaluation platform in accordance with some implementations of the present technology.

FIG. 6 is a block diagram that illustrates an example graphical user interface that demonstrates aspects of a differential analysis interface of the signal evaluation platform in accordance with some implementations of the present technology.

FIG. 7 is a block diagram that illustrates an example graphical user interface that demonstrates aspects of an informatics interface of the signal evaluation platform in accordance with some implementations of the present technology.

FIGS. 9A-B are block diagrams that illustrate an example graphical user interface that demonstrates aspects of a review interface of the signal evaluation platform in accordance with some implementations of the present technology.

FIG. 10 is a block diagram that illustrates an example graphical user interface that demonstrates aspects of a query repository of the signal evaluation platform in accordance with some implementations of the present technology.

Figure 1:
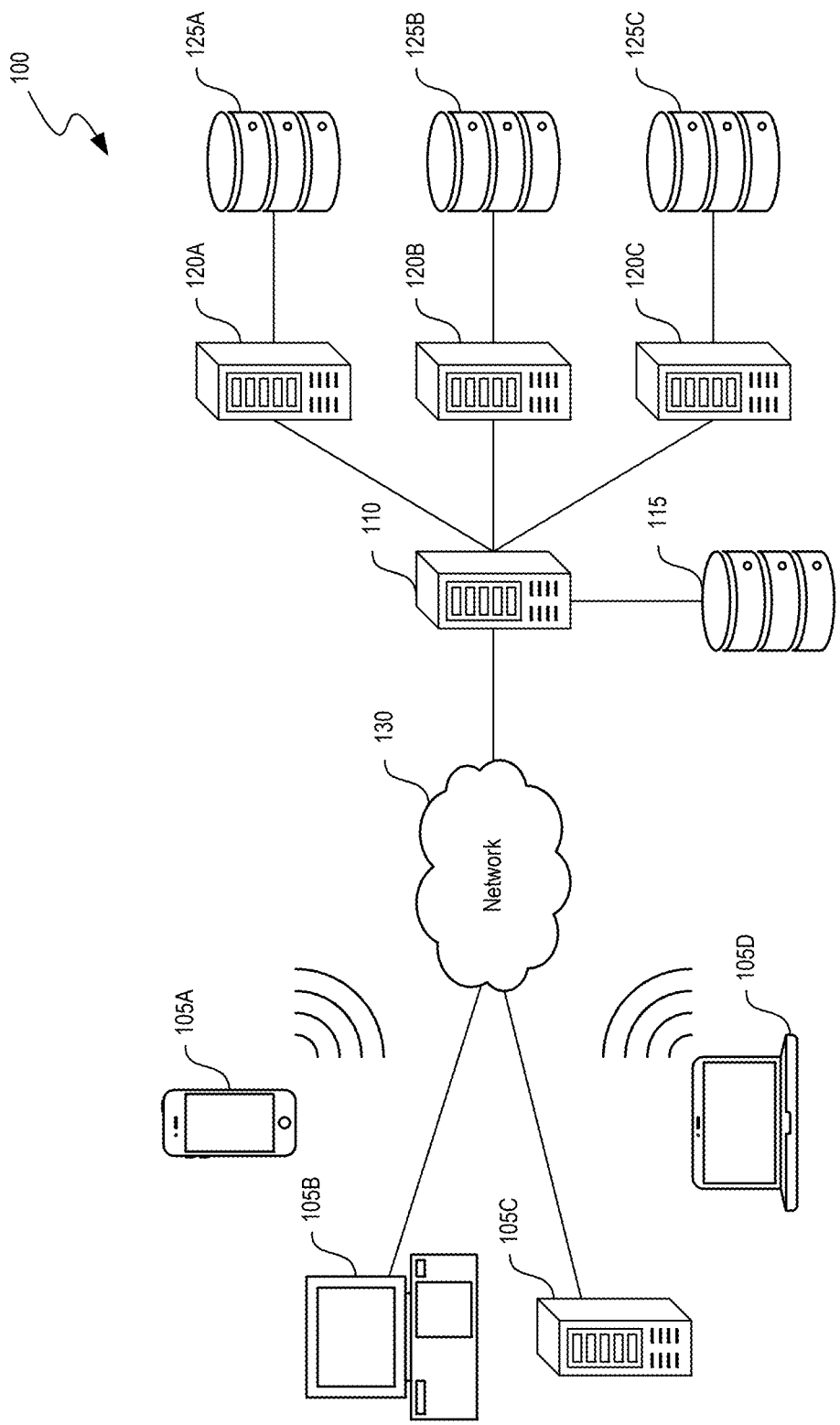
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Monitored systems are complex entities that generate large amounts of data based on human and/or machine activity. For example, conventional systems for regulatory reporting and financial analysis often lack comprehensive automation and intelligent insights, leading to inefficiencies and potential errors. These systems typically require significant manual effort to validate financial statements, generate flux analyses, and respond to queries from controllers or regulators. Conventional solutions may involve manual checks of financial data (e.g., verifying that asset and liability pages balance), time-consuming manual preparation of variance explanations (e.g., analyzing quarter-over-quarter or year-over-year changes in account balances), and labor-intensive processes for addressing regulatory inquiries. As another example, conventional energy consumption reporting systems (or, more generally, IoT monitoring systems) often lack comprehensive automation and real-time insights, leading to inefficiencies and potential cost overruns. These systems typically require significant manual effort to validate energy usage data, generate consumption reports, and respond to queries from building managers or regulatory bodies. Conventional solutions may involve manual checks of energy meter readings, time-consuming manual preparation of energy consumption analyses, and labor-intensive processes for identifying opportunities for energy efficiency improvements.

Additionally, conventional reporting platforms for monitored systems often struggle to provide unified platforms that can monitor activity across entities (e.g., departments, multiple buildings, manufacturing units), leaving gaps in tracking and oversight. The reliance on manual processes also makes these systems prone to inconsistencies, especially when dealing with complex regulations or integrating data from multiple sources. Furthermore, conventional solutions typically lack advanced analytics capabilities to automatically identify trends, anomalies, or potential resource optimization opportunities across large volumes of data.

To address these and other issues of conventional systems, the current disclosure describes systems, methods and computer-readable media for a signal evaluation platform that extends the capabilities of statistical inferencing models, including but not limited to machine learning (ML) models, generative machine learning models, and/or the like. As described herein, the capabilities of statistical inferencing models are extended by generating and pre-processing additional contextual data that enables greater richness and precision in analytics. Additionally, the techniques described herein enable capture and analysis of historical queries and query responses regarding monitored systems, which improves the system's ability to identify and consider contextual information that is most relevant to a particular use case.

In an example use case, the platform can receive a natural-language query via a user interface for information associated with digital artifacts (e.g., structured alphanumeric signal data indicative of performance characteristics) of a monitored system. The platform can evaluate the digital artifacts of the monitored system to calculate a performance differential report (e.g., a flux analysis report) and determine relevant historical dialogue records (e.g., prior natural-language queries and corresponding responses). Using the performance differential report and relevant historical dialogue records, the system can use a generative machine learning model to create a narrative response to the query using the performance differential report and historical records. The platform can transmit the generated response for display at the user interface, providing automated, intelligent insights into system performance and addressing user queries efficiently.

For illustrative purposes, examples are described herein in the context of computer systems for regulatory reporting and financial analysis. However, a person skilled in the art will appreciate that the disclosed system can be applied in other contexts. For example, the disclosed system can be used in healthcare compliance monitoring to automate the analysis of patient outcome data and generate narrative reports for regulatory bodies. The system can also be used in environmental monitoring to analyze sensor data from industrial facilities, identify potential compliance issues, and generate explanatory reports for regulatory agencies.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, computing environment 100 includes one or more client computing devices 105A-D, examples of which can host the signal evaluation platform 200 of FIG. 2. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, servers 110 and 120, or associated computing devices, comprise computing systems, such as the signal evaluation platform 200 of FIG. 2. Though each server 110 and 120, or associated computing device, is displayed logically as a single server, server computing devices can each be a distributed computing environment encompassing multiple computing devices located at the same or at geographically disparate physical locations. In some implementations, each server 120 corresponds to a group of servers.

Client computing devices 105 and servers 110 and 120, or associated computing devices, can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Signal Evaluation Platform

Figure 2:
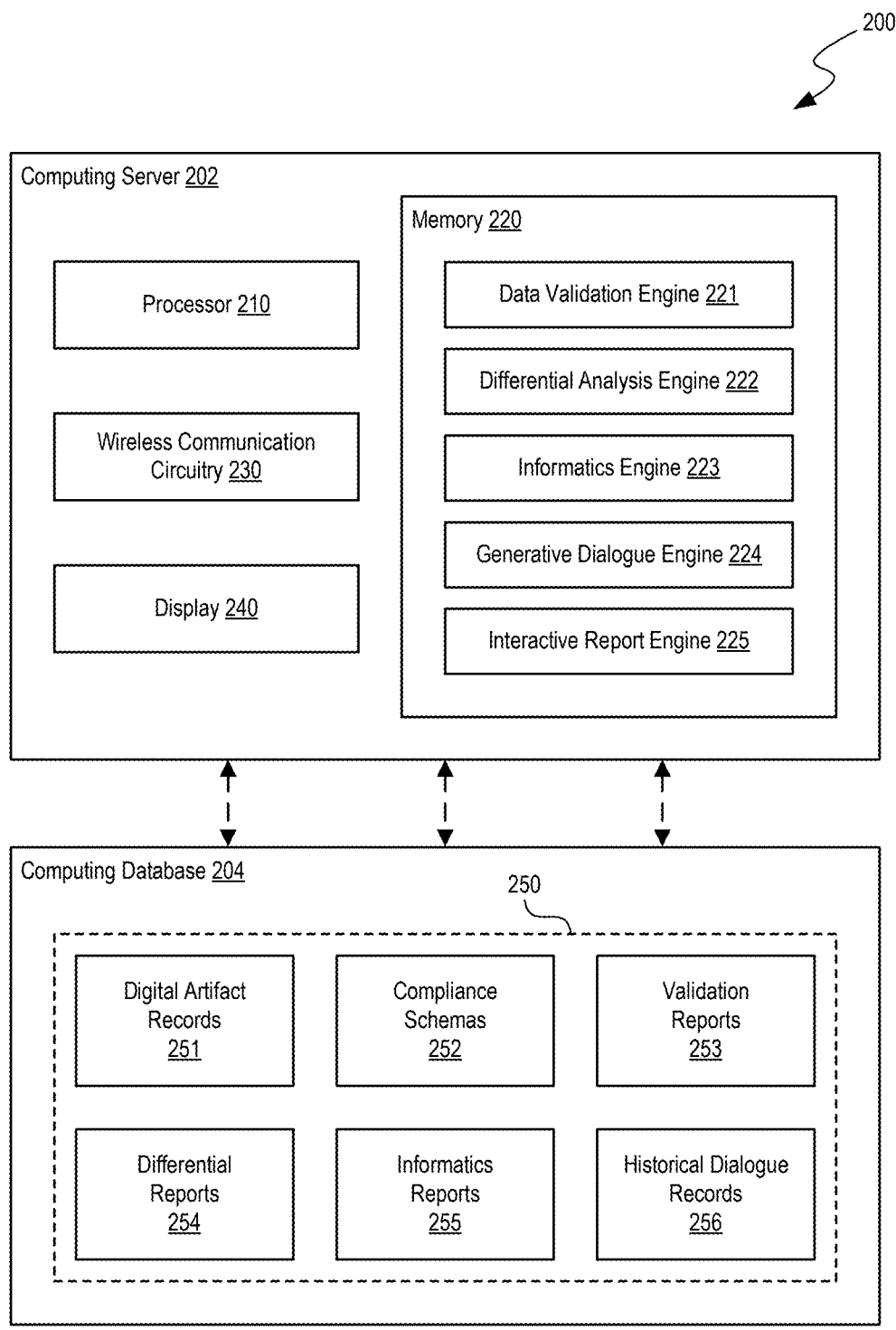
FIG. 2 is a block diagram that illustrates a signal evaluation platform that can implement aspects of the present technology.

FIG. 2 is a block diagram that illustrates a signal evaluation platform 200 ("platform 200") that can implement aspects of the present technology. The components shown in FIG. 2 are merely illustrative, and well-known components are omitted for brevity. As shown, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 130 described in reference to FIG. 1. As shown, the computing database 204 can be configured to store and/or service data structures 250 (e.g., stored data used by the computing server 202 to perform one or more operations described herein), including digital artifact records 251, compliance schemas 252, validation reports 253, performance differential reports 254 ("differential reports 254"), informatics reports, and/or historical dialogue records 256.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules.

As shown in FIG. 2, module of the memory 220 can include a data validation engine 221, a differential analysis engine 222, an informatics engine 223, a generative dialogue engine 224, and/or an interactive report engine 225. Other implementations of the computing server 202 include additional, fewer, or different modules, or distribute functionality differently between the modules. As used herein, the term "module" and/or "engine" refers broadly to software components, firmware components, and/or hardware components. Accordingly, the engines 221-225 could each comprise software, firmware, and/or hardware components implemented in, or accessible to, the computing server 202.

In some implementations, the signal evaluation platform 200 includes a data validation engine 221 configured to perform validation and compliance checks on digital artifacts. For example, the data validation engine 221 can receive digital artifacts (e.g., financial statements, regulatory filings, transaction records) and compliance schemas (e.g., regulatory requirements, accounting standards, internal policies) from various sources. As an illustrative example, the digital artifacts can be retrieved from internal databases (e.g., the computing database 204) or external systems (e.g., financial reporting platforms, regulatory portals) via the wireless communication circuitry 230. The compliance schemas can be obtained from regulatory bodies, industry associations, or internal compliance departments. The data validation engine 221 can analyze the contents of the digital artifacts against the compliance schemas using various methods (e.g., rule-based checks, pattern matching, statistical analysis). In a non-limiting example, the data validation engine 221 can verify numerical values in financial statements against predefined thresholds, check for completeness of required disclosures, or validate data formats and structures.

In some implementations, the data validation engine 221 includes a materiality indicator for validations. For example, the materiality indicator can assign importance levels to different validation checks based on predefined criteria (e.g., regulatory significance, financial impact, risk exposure). The materiality indicator can use machine learning algorithms to analyze historical validation data and determine the relative importance of various checks. As an illustrative example, validations related to core financial metrics or high-risk areas can be assigned higher materiality scores. The data validation engine 221 can prioritize validation efforts based on these materiality scores, focusing resources on the most critical checks. In another example, the materiality indicator can dynamically adjust materiality thresholds based on changing business conditions or regulatory requirements.

In some implementations, the data validation engine 221 provides next-best actions based on historical validations. For example, when a validation check fails, the data validation engine 221 can analyze similar historical instances to suggest potential resolution steps. The engine can utilize machine learning techniques (e.g., decision trees, neural networks) to identify patterns in successful resolution strategies. As an illustrative example, if a particular financial ratio falls outside the expected range, the data validation engine 221 can recommend specific data points to review or adjustments to consider based on past resolutions of similar issues. The next-best actions can be presented to users through the display 240, providing guided assistance in addressing validation failures.

In some implementations, the data validation engine 221 can perform real-time updates regarding digital artifacts, compliance schemas, and validation. For example, the engine can continuously monitor for changes in source data or regulatory requirements. When updates occur, the data validation engine 221 can automatically re-run affected validations and update results in real-time. As an illustrative example, if a new financial transaction is recorded, the engine can immediately validate it against relevant compliance schemas and update any impacted reports or dashboards. The real-time updates can be facilitated through event-driven architectures or streaming data processing techniques (e.g., Apache Kafka, Apache Flink) to ensure timely reflection of changes in the validation status.

In some implementations, the signal evaluation platform 200 includes a differential analysis engine 222 that calculates a performance differential report (e.g., a flux analysis) for the digital artifacts of a monitored system. For example, the differential analysis engine 222 can compare financial data or operational metrics between two time periods (e.g., current quarter vs. previous quarter, current year vs. previous year). The engine can utilize various statistical methods (e.g., percentage change calculations, variance analysis, trend analysis) to identify significant changes or anomalies. As an illustrative example, the differential analysis engine 222 can calculate the percentage change in revenue across different business segments, analyze shifts in expense ratios, or evaluate changes in key performance indicators. The resulting performance differential report can highlight areas of notable change, providing insights into the evolving financial or operational landscape of the monitored system.

In some implementations, the signal evaluation platform 200 includes an informatics engine 223 that can generate informatic analysis details. For example, the informatics engine 223 can produce comprehensive analyses on various aspects of the business, such as expense analysis, underwriting insights, re-insurance insights, investment insights, and financial ratios. The engine can utilize advanced data analytics techniques (e.g., data mining, predictive modeling, time series analysis) to extract meaningful patterns and trends from the digital artifacts. As an illustrative example, for expense analysis, the informatics engine 223 can break down costs by category, identify cost drivers, and highlight unusual spending patterns. For underwriting insights, it can analyze policy data, claims history, and risk factors to assess underwriting performance and suggest potential improvements. The informatics engine 223 can also generate a ratio pyramid, visually representing the hierarchical relationships between different financial ratios and their components.

In some implementations, the signal evaluation platform 200 includes a generative dialogue engine 224 that can provide an interactive chat module. For example, the generative dialogue engine 224 can utilize natural-language processing and machine learning techniques to understand and respond to user queries. The engine can access historical flux analyses, past regulator queries, and other relevant data stored in the historical dialogue records 256 to inform its responses. As an illustrative example, when a user asks about trends in a specific financial metric, the generative dialogue engine 224 can analyze historical data, consider past explanations provided to regulators, and generate a comprehensive response. The engine can employ advanced language models (e.g., transformer-based architectures) to formulate coherent and contextually appropriate answers. In another example, the generative dialogue engine 224 can proactively suggest related information or potential follow-up questions based on the context of the user's inquiry.

In some implementations, the signal evaluation platform 200 includes an interactive report engine 225 that can generate a unified view of validations for the user interface. For example, the interactive report engine 225 can aggregate validation results from the data validation engine 221, performance insights from the differential analysis engine 222, and analytical details from the informatics engine 223 into a cohesive, interactive dashboard. The engine can utilize data visualization techniques (e.g., charts, heatmaps, interactive graphs) to present complex information in an easily digestible format. As an illustrative example, the unified view can display validation status across different categories, highlight trends from the flux analysis, and provide drill-down capabilities for detailed exploration of specific metrics or issues. The interactive report engine 225 can also incorporate user customization options, enabling individuals to tailor the dashboard to their specific needs or preferences.

In some implementations, the interactive report engine 225 can generate a reporting schedule with automated roll-forward capability. For example, the engine can create a dynamic schedule of reporting tasks based on regulatory deadlines, internal timelines, and dependencies between different reports. The automated roll-forward capability can intelligently adjust future reporting dates based on the completion of current tasks or changes in regulatory requirements. As an illustrative example, if a quarterly report is delayed, the system can automatically recalculate subsequent deadlines and notify relevant stakeholders. The reporting schedule can be integrated with task management features, enabling users to track progress, assign responsibilities, and manage workflows directly through the interface.

In some implementations, the signal evaluation platform 200 can calculate performance metrics and Key Performance Indicators (KPIs). For example, the platform can aggregate data from various digital artifacts to compute a wide range of financial and operational metrics. The calculation methods can include simple arithmetic operations, complex statistical analyses, or industry-specific formulas. As an illustrative example, the platform can calculate financial ratios (e.g., return on equity, debt-to-equity ratio), operational efficiency metrics (e.g., claims processing time, policy renewal rate), or risk-related KPIs (e.g., combined ratio, loss ratio). The calculated metrics and KPIs can be stored in the computing database 204 and made available for use by other components of the signal evaluation platform 200, such as the informatics engine 223 or the interactive report engine 225.

In some implementations, the signal evaluation platform 200 can generate anomalies in trends and patterns for key financial ratios, capital adequacy, and underwriting performance. For example, the platform can employ statistical techniques (e.g., z-score analysis, moving averages, exponential smoothing) to identify data points that deviate significantly from expected values or historical trends. As an illustrative example, the platform can flag sudden spikes in loss ratios, unexpected changes in capital adequacy metrics, or unusual patterns in underwriting profitability across different business lines. The anomaly detection can be performed on various time scales (e.g., daily, weekly, monthly) and can consider seasonality and other cyclical factors. The identified anomalies can be highlighted in reports generated by the interactive report engine 225 and can trigger alerts for further investigation.

In some implementations, the signal evaluation platform 200 can provide rationale for variation in quarter-over-quarter and year-over-year figures for significant movements above predefined thresholds. For example, the platform can analyze historical data, current market conditions, and internal business factors to generate explanations for notable changes in financial metrics. The rationale generation can utilize a combination of rule-based logic and machine learning algorithms to identify relevant factors and construct coherent explanations. As an illustrative example, if revenue shows a significant year-over-year increase, the system can analyze sales data, market expansion efforts, and economic indicators to provide a detailed explanation of the growth drivers. The generated rationales can be incorporated into flux analysis reports, used to respond to regulator queries, or presented in management dashboards to provide context for performance changes.

Signal Evaluation Interface

Figure 3:
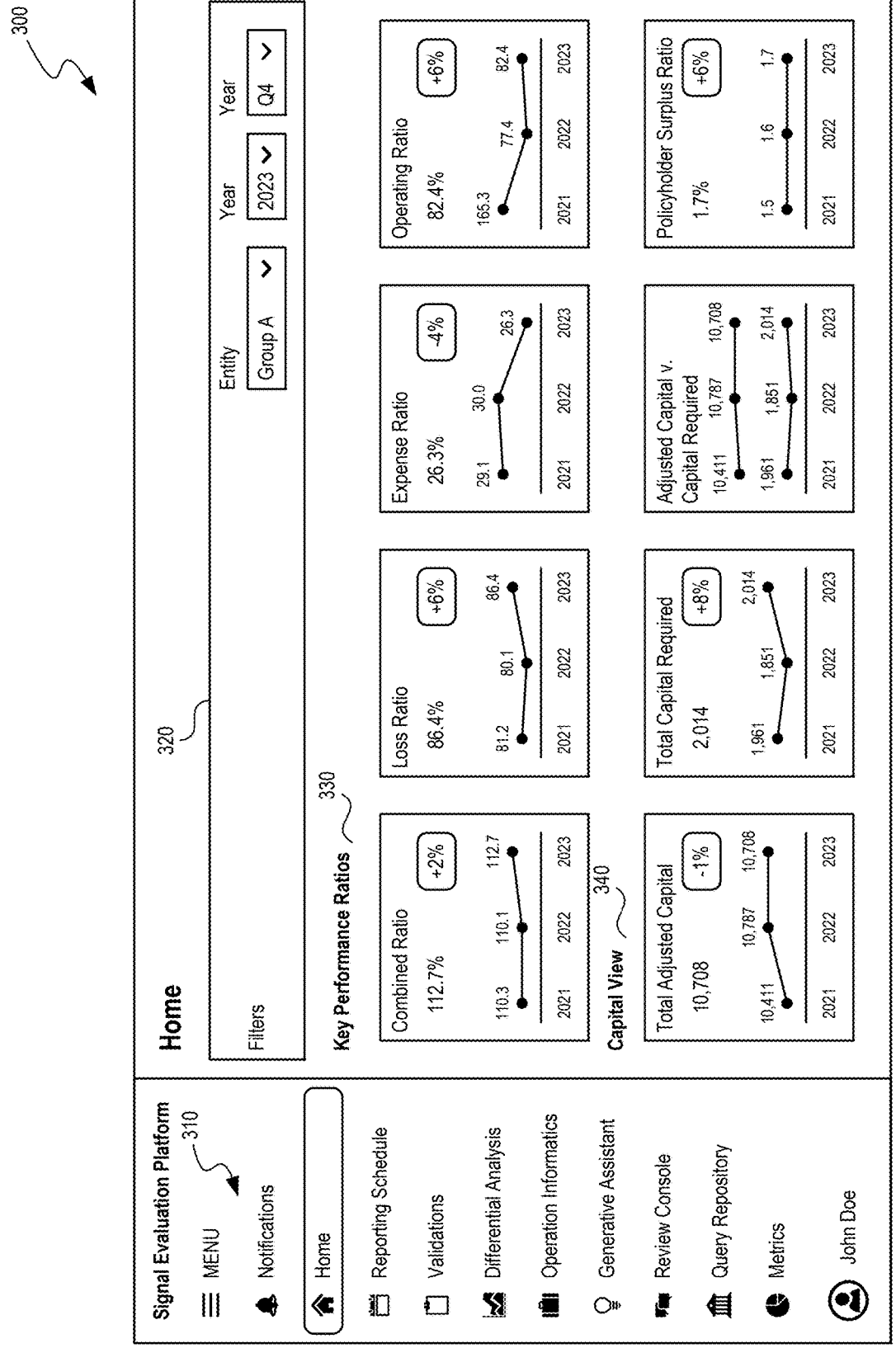
FIG. 3 is a block diagram that illustrates an example graphical user interface that demonstrates aspects of a signal evaluation interface of the signal evaluation platform in accordance with some implementations of the present technology.

FIG. 3 is a block diagram that illustrates an example graphical user interface 300 ("interface 300") that demonstrates aspects of a signal evaluation interface of the signal evaluation platform in accordance with some implementations of the present technology. Interface 300 is implemented using components of the example computer environment 100 illustrated and described in more detail with reference to FIG. 1. Likewise, implementations of interface 300 can include different and/or additional components or can be connected in different ways. Interface 300 is a visual interface that enables users to interact with electronic devices using graphical elements (e.g., windows, icons, buttons, and/or the like) rather than text-based commands.

In some implementations, a signal evaluation interface 300 can be displayed on the display 240 of the computing server 202. The signal evaluation interface 300 can provide a visual representation of various performance metrics and ratios related to the monitored system. For example, the signal evaluation interface 300 can include a menu section that enables users to navigate to different interfaces generated and/or presented by the platform 200. As an illustrative example, the menu section 310 can comprise navigation options (e.g., a side-bar of buttons, a list of bookmarks, and/or the like) that redirects users to different interfaces, and/or component elements thereof, such as a home interface, a reporting schedule interface, a validation interface, a differential analysis interface, an informatics interface (e.g., operation informatics interface), a generative assistant interface, a review console interface, a query repository interface, and/or a metrics interface (e.g., a summative key performance indicator (KPI) interface).

In some implementations, the home interface of the signal evaluation interface 300 can display a filter interface 320 that enables users to select specific entity, year, and quarter parameters. For example, the filter interface 320 enables users to customize the displayed information based on specific time periods or organizational units. In a non-limiting example, a user can select a particular entity (e.g., "ABC Casualty Company"), year (e.g., "2023"), and quarter (e.g., "Q4") to view relevant performance data.

In some implementations, the signal evaluation interface 300 can present key performance ratios in graphical format. For example, the interface can include a performance ratios section 330 (e.g., key performance ratios interface section) that displays combined ratio, loss ratio, expense ratio, and operating ratio. In another example, each ratio display can include trend lines showing data points across multiple years (e.g., 2021-2023) with percentage changes indicated. Accordingly, users can quickly assess performance trends and changes over time.

In some implementations, the signal evaluation interface 300 can include a capital view section 340 presenting multiple capital-related metrics. For example, this section can display total adjusted capital, total capital required, adjusted capital versus capital required, and policyholder surplus ratio. In a non-limiting example, these metrics can be presented with trend lines showing historical data points (e.g., from 2021-2023). By presenting this information visually, the signal evaluation interface 300 can enable users to efficiently monitor and analyze various financial and operational metrics.

In some implementations, the signal evaluation platform 200 can transmit the generated narrative response for display at the signal evaluation interface 300. For example, when a user submits a natural-language query through the interface, the generative dialogue engine 224 can generate a narrative response based on the relevant digital artifact records 251 and historical dialogue records 256. As an illustrative example, the generated narrative response can be displayed in a dedicated section of the signal evaluation interface 300, providing users with context-specific information based on their queries.

In some implementations, the signal evaluation platform 200 can transmit a supplemental narrative response for display alongside the generated response on the signal evaluation interface 300. For example, the differential analysis engine 222 can identify data fluctuation patterns between digital artifact sets, and the generative dialogue engine 224 can generate a supplemental narrative describing these patterns. In another example, this supplemental narrative can be presented in a separate panel or section of the interface, enabling users to view both the direct response to their query and additional relevant insights simultaneously.

In some implementations, the signal evaluation interface 300 can incorporate interactive elements to enhance user engagement with the displayed data. For example, users can hover over or click on specific data points in the graphical representations to view detailed information. In a non-limiting example, clicking on a particular ratio in the performance ratios section 330 can expand the view to show constituent components or additional historical data. Accordingly, the signal evaluation interface 300 can provide multiple layers of information accessibility, enabling users to drill down into specific areas of interest.

FIG. 4 is a block diagram that illustrates an example graphical user interface 400 ("interface 400") that demonstrates aspects of a scheduling interface 400 of the signal evaluation platform in accordance with some implementations of the present technology. Interface 400 is implemented using components of the example computer environment 100 illustrated and described in more detail with reference to FIG. 1. Likewise, implementations of interface 400 can include different and/or additional components or can be connected in different ways. Interface 400 is a visual interface that enables users to interact with electronic devices using graphical elements (e.g., windows, icons, buttons, and/or the like) rather than text-based commands.

In some implementations, a scheduling interface 400 can be displayed on the display 240 of the computing server 202. The scheduling interface 400 can provide functionality for managing and tracking regulatory reporting tasks and deliverables. For example, the scheduling interface 400 can display a reporting schedule that includes a filter interface 410 enabling users to select specific years and periods. As an illustrative example, a user can select a particular year (e.g., "2023") and quarter (e.g., "Q4") to view relevant scheduling information.

In some implementations, the scheduling interface 400 can present statutory reporting schedule information 420. As shown in FIG. 4, the interface 400 can display detailed schedule information 420 associated with an entity (e.g., an enterprise group, a set of authorized users and/or owners, and/or the like), a reporting year, a reporting period, a complexity level, an analyst status, and a reviewer status for various reporting tasks in a tabular format. In additional or alternative implementations, the tabular format can further comprise individual rows representing scheduling information 420 related to a specific reporting task 430, with columns indicating the assigned entities (e.g., an analyst, a reviewer, and/or the like), a task deadline, a task completion date, and/or a review date.

In some implementations, the scheduling interface 400 can include sections for schedule information 420 related to individual digital artifact records. In a non-limiting example, the interface 400 can display a table (e.g., an integrated table within each individual entity section) where each row corresponds to a specific digital artifact record, or a specific sub-task 440, with corresponding columns indicating an identifier (e.g., an artifact title), a deadline (e.g., due date of task associated with digital artifact), a completion date, a completion status (e.g., an analyst status), a review deadline, a review date, and/or a review status. As an illustrative example, a user can view the progress of multiple reporting tasks simultaneously, with visual indicators showing whether tasks are on schedule, completed, or overdue.

In some implementations, the scheduling interface 400 can provide functionality for adding entities and rolling forward schedules. For example, the interface can include dedicated buttons or controls for these actions. In a non-limiting example, a user can click an "Add Entity" button to include a new organizational unit in the reporting schedule or use a "Roll Forward" function to automatically generate future schedules based on existing templates.

In some implementations, the scheduling interface 400 can organize information hierarchically. For example, high-level entity information can be expandable to show detailed task and review information. As an illustrative example, a user can click on an entity name to reveal a list of all associated reporting tasks, their current status, and any pending reviews.

In some implementations, the scheduling interface 400 can incorporate status indicators throughout the interface. For example, these indicators can display the progress of various tasks and reviews using color-coding or icons. In a non-limiting example, completed tasks can be marked with a green checkmark, while overdue items can be highlighted in red.

In some implementations, the scheduling interface 400 can be configured to generate a reporting schedule with automated roll-forward capability. For example, the interactive report engine 225 can analyze historical scheduling data from the digital artifact records 251 to create future reporting schedules. In a non-limiting example, the system can automatically populate task deadlines and review cycles for upcoming reporting periods based on patterns identified in previous schedules. By automating this process, the scheduling interface 400 can help reduce manual effort in schedule creation and maintain consistency across reporting cycles.

Figure 5B:
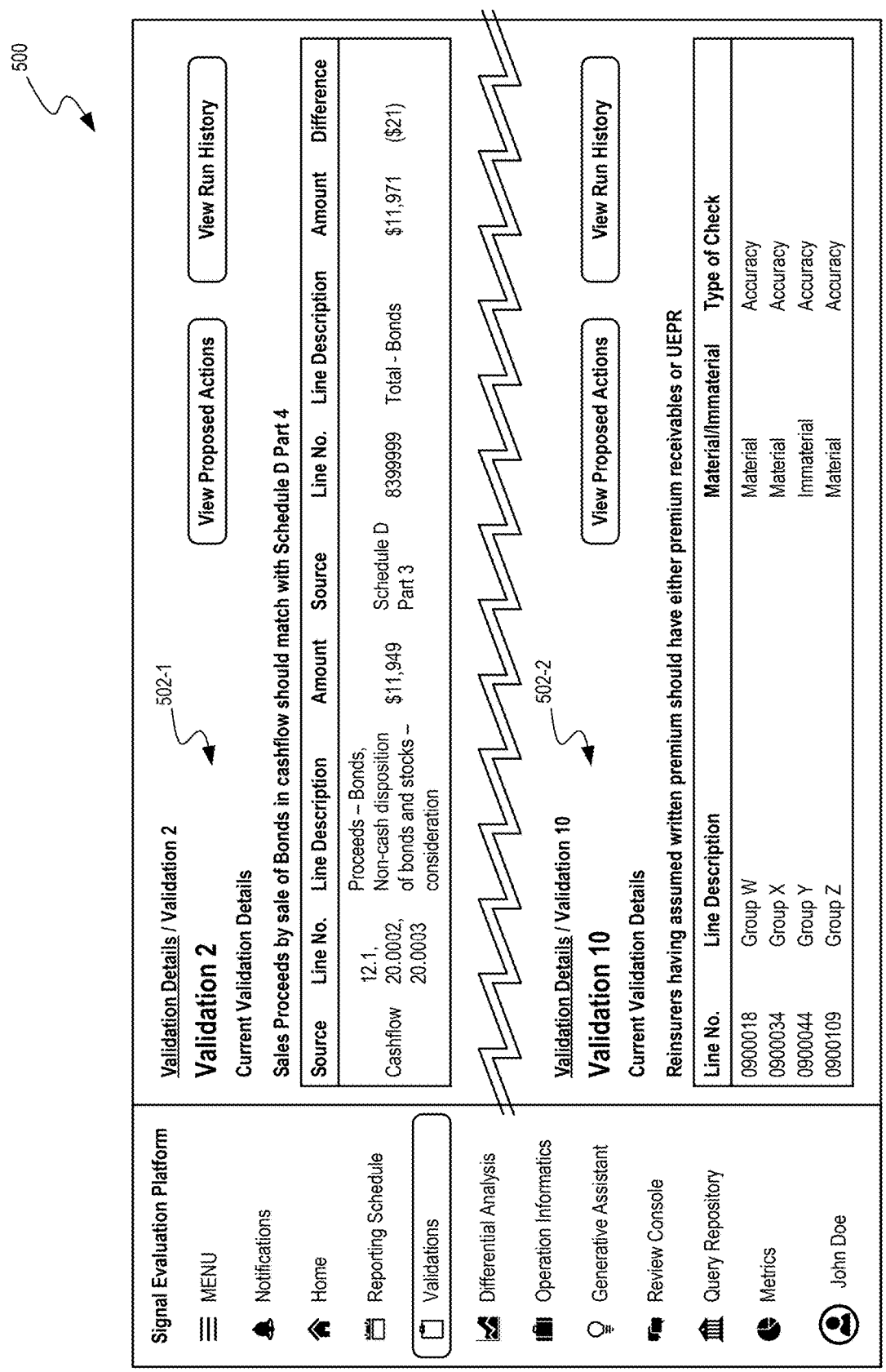

FIGS. 5A-C are block diagrams that illustrate an example graphical user interface 500 ("interface 500") that demonstrates aspects of a validation interface of the signal evaluation platform in accordance with some implementations of the present technology. Interface 500 is implemented using components of the example computer environment 100 illustrated and described in more detail with reference to FIG. 1. Likewise, implementations of interface 500 can include different and/or additional components or can be connected in different ways. Interface 500 is a visual interface that enables users to interact with electronic devices using graphical elements (e.g., windows, icons, buttons, and/or the like) rather than text-based commands.

In some implementations, a validation interface 500 can be displayed on the display 240 of the computing server 202. The validation interface 500 can provide functionality for displaying and managing validation details for financial statements. In some implementations, the validation interface 500 can include a filter interface 510 that enables users to select specific entity, year, and quarter parameters to customize the displayed validation data.

In some implementations, the validation interface 500 can present validation results 520 from evaluating compliance of one or more digital artifact records (e.g., with respect to stored compliance schemas). For example, the interface 500 can display the individual validation result information as rows of a tabular format. As shown in FIG. 5A, the interface 500 can further display, for each row corresponding to an individual validation result, a set of columns indicating a specific validation identifier (e.g., validation number), a narrative explanation (e.g., of the validation result), a reference data source (e.g., data user during validation process), a comment section, a status indicator, and one or more available actions. In a non-limiting example, a validation entry can show details such as "Validation 2: Sales proceeds by sale of bonds in cashflow should match with Schedule D Part 4" along with corresponding source information and status.

In some implementations, the validation interface 500 can include validation statistics 530. For example, the interface can display total validations, passed validations, and failed validations, with a refresh option to update the information. Accordingly, users can quickly assess the overall status of validations and identify areas requiring attention.

In some implementations, the interface 500 can include separate, embedded interfaces that display detailed information associated with individual validation results 520. In a non-limiting example, the interface 500 can be configured to enable users to selectively request additional details associated with an individual validation result in response to selection of a specific interface element (e.g., selection of the row corresponding to the validation result). As shown in FIG. 5B, the interface 500 can display a secondary interface 502 (e.g., a redirected page) that displays additional and/or hidden information for the selected validation result that may not be displayed on the initial interface element (e.g., table presenting all validation results).

For illustrative purposes, FIG. 5B presents two non-limiting examples of secondary interfaces 502-1 and 502-2 that display disparate information associated with a first validation result (e.g., "Validation 2") and a second validation result (e.g., "Validation 10") respectively. For example, the first secondary interface 502-1 presents additional information associated with a comparative validation result. As shown in FIG. 5B, the additional information associated with the first validation result can include a first data source (e.g., a first digital artifact record, a financial statement, and/or the like), a first reference identifier (e.g., location of a value in the first digital artifact record, a line number, and/or the like), a first narrative description (e.g., explanation of the identified value of the first digital artifact, a description of values listed at the line number, and/or the like), a first value (e.g., a monetary value), a second data source, a second reference identifier, a second narrative description, a second value, and a calculated difference between the first and the second values. In another example, the second secondary interface 502-2 presents additional information associated with a categorical validation result. As shown in FIG. 5B, the additional information associated with the second validation result can include a reference identifier (e.g., a line number of a financial statement), a narrative description (e.g., an explanation of values listed at the line number), a categorical label, and a type of check (e.g., an accuracy evaluation). In some implementations, the categorical label can correspond to a materiality designation (e.g., "Material" or "Immaterial") for each validation result. As a result, users can prioritize their attention on validations that have a more significant impact on the financial statements.

In some implementations, the validation interface 500 can include additional functions for presenting proposed, or recommended, remediation actions (e.g., recommended resolutions for failed validation results) and a validation run history (e.g., an time-log identifying specific evaluation steps and/or processes that determined the validation result). For example, the interface can display user interactive "View Proposed Actions" and "View Run History" buttons for each validation result on the secondary interfaces 502. By incorporating these features, the interfaces 502 enable users to access additional validation-related functions and historical data, as described in further detail with respect to FIG. 5C.

In some implementations, the interface 500 can include additional embedded interfaces that display further information associated with individual validation results 520. For instance, the secondary interfaces 502 can include additional embedded tertiary interfaces 504 (e.g., a hierarchy of linked interfaces) that display information related to recommended remediation actions (e.g., in response to failed validation results) and/or specific input-output executions for generating the validation results (e.g., a validation activity/run log). As shown in FIG. 5C, an example tertiary interface 504 for the first validation result (e.g., "Validation 2") can display an example recommendation "Reach out to reinsurance team to provide explanation for absence of unearned premium or assumed premium receivable" to help the user resolve the failure of the first validation result.

In some implementations, the interfaces 500, including the secondary interfaces 502 and the tertiary interfaces 504, can work in conjunction with the data validation engine 221 to provide a comprehensive validation management system. For example, the interfaces can display the results of automated validations performed by the data validation engine 221, while also enabling users to interact with and respond to validation issues. By integrating automated validation processes with user-friendly interfaces, the signal evaluation platform 200 can streamline the validation workflow and improve the accuracy of financial reporting.

FIG. 6 is a block diagram that illustrates an example graphical user interface 600 ("interface 600") that demonstrates aspects of a differential analysis interface of the signal evaluation platform in accordance with some implementations of the present technology. Interface 600 is implemented using components of the example computer environment 100 illustrated and described in more detail with reference to FIG. 1. Likewise, implementations of interface 600 can include different and/or additional components or can be connected in different ways. Interface 600 is a visual interface that enables users to interact with electronic devices using graphical elements (e.g., windows, icons, buttons, and/or the like) rather than text-based commands.

The differential analysis interface 600 can provide functionality for analyzing and displaying comparative performance characteristics 620 associated with digital artifact records (e.g., flux analysis of financial statements). As shown in FIG. 6, the differential analysis interface 600 can present comparative metrics between two or more digital artifacts in a tabular format. For example, the interface 600 can display a table of performance characteristics 620 where each row corresponds to a specific comparative attribute between the digital artifact records (e.g., a compared line item between multiple digital artifacts). As shown in FIG. 5B, an individual comparative attribute (e.g., tabular row) can include one or more categories (e.g., tabular columns) including, but not limited to, a component identifier of the digital artifact record (e.g., a financial statement line value location), a narrative description (e.g., a text explanation of line value description), a first value corresponding to a first digital artifact record (e.g., current financial statement period line item value), a second (e.g., or multiple) value corresponding to a second (e.g., or a plurality) digital artifact record (e.g., prior financial statement period line item value), an objective narrative (e.g., factual explanations based on numerical data), a subjective narrative (e.g., narrative explanations submitted by a user), and options for attachments (e.g., supporting documentation) and available user actions. In some implementations, the differential analysis interface 600 can display various financial metrics. For example, the interface can present metrics such as premium earned, losses incurred, losses adjustment expenses, and other underwriting data. In a non-limiting example, the interface can show a comparison between current period premium earned (e.g., $6,427,000) and prior period premium earned (e.g., $6,194,000), along with a factual explanation of the change.

In some implementations, the interface 600 can include a filter interface 610 that enables users to select specific entity, year, and quarter parameters to customize the displayed performance characteristics 620. For example, the interface can present a filter interface 610 that includes dropdown menus enabling users to select specific entity and time period filter options. Accordingly, users can customize the displayed financial data comparisons based on specific organizational units and reporting periods.

In some implementations, the signal evaluation platform 200 can calculate a performance differential report using alphanumeric signals of the first and second digital artifact sets. For example, the differential analysis engine 222 can process structured alphanumeric signals from digital artifact records 251 corresponding to different time periods to generate the performance differential report. As a result, the differential analysis interface 600 can display comprehensive comparisons of financial metrics across reporting periods.

In some implementations, the signal evaluation platform 200 can identify data fluctuation patterns from the calculated performance differential report. For example, the differential analysis engine 222 can analyze the performance differential report to detect significant changes or trends in financial metrics. In a non-limiting example, the system can identify a pattern of increasing premium earned across multiple reporting periods and highlight this trend in the differential analysis interface 600.

In some implementations, the signal evaluation platform 200 can identify anomalous data fluctuation patterns within the performance differential report. For example, the differential analysis engine 222 can detect fluctuations that exceed predefined thresholds or deviate significantly from historical trends. In a non-limiting example, an anomalous data fluctuation pattern can comprise specific types of data, such as resource expenditure, resource allocation, risk assessment, asset indemnity, or comparative constants for performance metrics.

In some implementations, the differential analysis interface 600 can highlight anomalous data fluctuation patterns. For example, the interface can use visual cues such as color coding or icons to draw attention to metrics with unusual changes. As a result, users can quickly identify areas that may require further investigation or explanation.

In some implementations, the differential analysis interface 600 can provide both numerical data comparisons and explanatory text. For example, the interface can display the quantitative difference between current and prior period values alongside narrative explanations describing the reasons for significant changes. As an illustrative example, a narrative explanation can provide context for a substantial increase in premium earned, such as expansion into new markets or the introduction of new insurance products.

In some implementations, the differential analysis interface 600 can include options for accessing supporting documentation. For example, the interface can provide document links in an attachments column for each line item analysis. Accordingly, users can easily access additional information or source documents related to specific financial metrics or explanations.

In some implementations, the differential analysis interface 600 can enable users to input or modify narrative explanations. For example, the interface can include editable text fields where users can provide additional context or clarification for identified data fluctuations. By enabling user input, the differential analysis interface 600 can facilitate collaborative analysis and documentation of financial performance changes.

In some implementations, the differential analysis interface 600 can integrate with other components of the signal evaluation platform 200. For example, the interface can leverage data from the data validation engine 221 to ensure the accuracy of displayed financial metrics. As an illustrative example, the interface can display validation status indicators alongside financial data comparisons, providing users with confidence in the reliability of the analysis.

FIG. 7 is a block diagram that illustrates an example graphical user interface 700 ("interface 700") that demonstrates aspects of an informatics interface of the signal evaluation platform in accordance with some implementations of the present technology. Interface 700 is implemented using components of the example computer environment 100 illustrated and described in more detail with reference to FIG. 1. Likewise, implementations of interface 700 can include different and/or additional components or can be connected in different ways. Interface 700 is a visual interface that enables users to interact with electronic devices using graphical elements (e.g., windows, icons, buttons, and/or the like) rather than text-based commands.

In some implementations, the informatics interface 700 can provide functionality for analyzing and tracking key performance metrics and ratios related to insurance operations. For example, the informatics interface 700 can display a performance ratio hierarchy map 720. As shown in FIG. 7, the hierarchy map can present a visual representation of key performance ratios (e.g., loss ratio, expense ratio, paid ratio, change in paid ratio, direct acquisition cost ratio, indirect acquisition cost ratio, combination ratio, and/or the like) and their component and/or constituent performance metrics. In a non-limiting example, the hierarchy map can show a combined ratio calculation at the top level, incorporating losses incurred and underwriting expenses divided by premium earned.

In some implementations, the performance ratio hierarchy map can branch into lower-level components. For example, below the combined ratio, the hierarchy can split into loss ratio and expense ratio components. In a non-limiting example, these components can further branch into more granular elements such as paid ratio, change in paid ratio, direct acquisition cost ratio, and indirect acquisition cost ratio. Accordingly, users can specify specific aspects of the overall performance to identify areas of strength or concern.

In some implementations, the interface 700 can include a filter interface 710 that enables users to select specific entity, year, and quarter parameters to customize the displayed information. For example, the interface can present a filter interface 610 that includes dropdown menus enabling users to select a specific entity, year, and/or quarter parameters. Accordingly, users can customize the displayed performance ratio hierarchy map 720 to focus on performance metrics data obtained from digital artifact records (e.g., financial statements) of specific organizational units and reporting periods.

In some implementations, the performance ratio hierarchy map can display historical values for multiple years. For example, the combined ratio calculation can show trend lines or data points for several consecutive years (e.g., 2021, 2022, and 2023). By presenting this historical data, the informatics interface 700 can enable users to identify trends and patterns in performance over time.

In some implementations, the signal evaluation platform 200 can transmit a hierarchical map of interactive visual elements for display at the informatics interface 700. For example, the interactive report engine 225 can generate a map of clickable or hover-able elements representing different performance ratios and metrics. As an illustrative example, users can interact with these elements to reveal additional details, historical data, or explanatory information about specific ratios.

In some implementations, the interactive visual elements in the performance ratio hierarchy map can incorporate distinctive visual markings to highlight anomalous data fluctuation patterns. For example, ratios or metrics that deviate significantly from historical trends or exceed predefined thresholds can be displayed with different colors, icons, or other visual indicators. In a non-limiting example, a ratio showing an unusually large increase compared to previous years can be marked with a red upward arrow or highlighted in a contrasting color. By using these visual cues, the informatics interface 700 can draw attention to areas that may require further investigation or explanation.

In some implementations, the informatics interface 700 can enable users to customize the display of the performance ratio hierarchy map. For example, users can have the option to expand or collapse different branches of the hierarchy, adjust the time range for historical data, or modify the thresholds for anomaly detection. As a result, users can tailor the interface to their specific analytical needs and preferences.

In some implementations, the informatics interface 700 can integrate data from other components of the signal evaluation platform 200. For example, the interface can incorporate validation results from the data validation engine 221 or differential analysis data from the differential analysis engine 222. By combining these different data sources, the informatics interface 700 can provide a comprehensive view of the insurance operations' performance and health.

In some implementations, the informatics interface 700 can generate informatics reports based on the displayed performance ratio hierarchy map. For example, the interactive report engine 225 can create detailed reports summarizing the key performance metrics, trends, and anomalies identified in the hierarchy map. These informatics reports can be stored in the computing database 204 as part of the service data structures 250, enabling for easy retrieval and reference in future analysis sessions.

Figure 8:
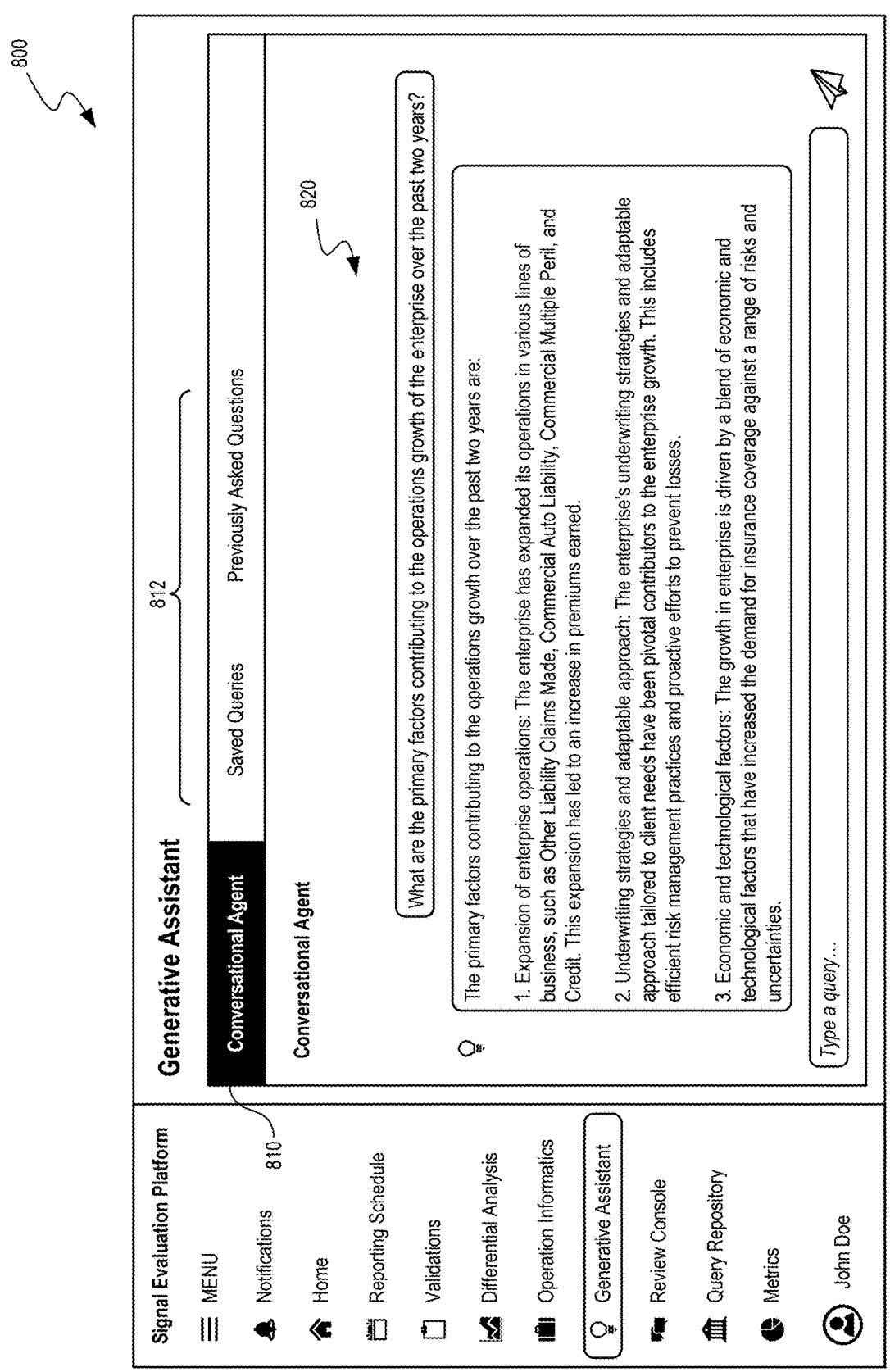
FIG. 8 is a block diagram that illustrates an example graphical user interface that demonstrates aspects of a generative assistant interface of the signal evaluation platform in accordance with some implementations of the present technology.

FIG. 8 is a block diagram that illustrates an example graphical user interface 800 ("interface 800") that demonstrates aspects of a generative assistant interface of the signal evaluation platform in accordance with some implementations of the present technology. Interface 800 is implemented using components of the example computer environment 100 illustrated and described in more detail with reference to FIG. 1. Likewise, implementations of interface 800 can include different and/or additional components or can be connected in different ways. Interface 800 is a visual interface that enables users to interact with electronic devices using graphical elements (e.g., windows, icons, buttons, and/or the like) rather than text-based commands.

In some implementations, the generative assistant interface 800 can provide functionality for interacting with the signal evaluation platform 200 through natural-language queries (e.g., alphanumeric text based prompts). For example, the generative assistant interface 800 can include an embedded conversational agent 810 that is configured to receive and respond to natural-language queries submitted by the end user (e.g., via a real-time chat interface 820). In some implementations, the interface 800 can include a historical dialogue interface 812 that displays one or more recorded dialogues and/or interactions (e.g., turn-based conversation history, user saved natural-language queries, previous natural-language queries submitted by the user, and/or the like) between the user and the conversational agent 810.

In some implementations, the generative assistant interface 800 can include a query input field. For example, the query input field can be configured to accept natural-language queries from users. As an illustrative example, a user can type a question such as "What are the primary factors contributing to business growth?" into the query input field. Accordingly, the generative assistant interface 800 can facilitate intuitive interaction with the signal evaluation platform 200 without requiring users to formulate queries in a specific technical format.

In some implementations, the signal evaluation platform 200 can receive a natural-language query via the generative assistant interface 800. For example, when a user enters a query into the query input field, the generative dialogue engine 224 can process the input and initiate the generation of a response. As a result, the signal evaluation platform 200 can dynamically respond to user inquiries about various aspects of the monitored system's performance and operations.

In some implementations, the signal evaluation platform 200 can use a generative machine learning model (e.g., a large language model, a natural-language processing algorithm, and/or the like) to generate a narrative response. For example, the generative dialogue engine 224 can utilize a transformer-based language model trained on relevant financial and operational data to construct coherent and contextually appropriate responses. In a non-limiting example, the generative machine learning model can analyze the received natural-language query, relevant digital artifact records 251, and historical dialogue records 256 to formulate a comprehensive response.

In some implementations, the signal evaluation platform 200 can generate a supplemental narrative response using a supplementary alphanumeric signal set. For example, the generative dialogue engine 224 can incorporate additional contextual information from the differential analysis engine 222 or the informatics engine 223 to enrich the primary response. In a non-limiting example, the supplemental narrative can provide trend analysis or comparative metrics related to the user's query, offering a more comprehensive view of the queried topic.

In some implementations, the generative assistant interface 800 can enable users to interact with the system through follow-up queries. For example, the interface can maintain context from previous queries within a session, enabling users to ask related questions without repeating all the initial context. As a result, users can engage in more natural, conversation-like interactions with the signal evaluation platform 200, progressively exploring complex topics or drilling down into specific areas of interest.

In some implementations, the generative assistant interface 800 can integrate with other components of the signal evaluation platform 200 to provide comprehensive responses. For example, the interface can leverage data from the validation reports 253, differential reports 254, and informatics reports 255 stored in the computing database 204 to support the generated narratives. Accordingly, the generative assistant interface 800 can serve as a unified access point for users to retrieve and analyze information from various aspects of the monitored system's operations and performance.

FIGS. 9A-B are block diagrams that illustrate an example graphical user interface 900 ("interface 900") that demonstrates aspects of a review interface of the signal evaluation platform in accordance with some implementations of the present technology. Interface 900 is implemented using components of the example computer environment 100 illustrated and described in more detail with reference to FIG. 1. Likewise, implementations of interface 900 can include different and/or additional components or can be connected in different ways. Interface 900 is a visual interface that enables users to interact with electronic devices using graphical elements (e.g., windows, icons, buttons, and/or the like) rather than text-based commands.

In some implementations, the interface 900 can include a filter interface 910 that enables users to select specific entity, year, and quarter parameters to customize the displayed information. For example, the interface can present a filter interface 910 that includes dropdown menus enabling users to select a specific entity, year, and/or quarter parameters. Accordingly, users can customize the displayed information to focus on review items 920 associated with digital artifact records (e.g., financial statements) and/or entities (e.g., an enterprise group, an analyst, a reviewer, and/or the like) of specific organizational units and reporting periods.

In some implementations, the review interface 900 can display a table comprising columns for various attributes of review items 920. For example, the interface 900 can display a table such that each row corresponds to an individual review item 920 (e.g., a review target of a financial statement) and each column corresponds to a specific attribute for the review item 920, such as a title, an assigned entity (e.g., an enterprise group, an analyst, a reviewer/controller, and/or the like), an attachment, a status indicator (e.g., a KPI reporting status, a completion status, an accessibility status, and/or the like).

In some implementations, the review interface 900 can provide interactive elements for accessing additional information or performing actions on review items. For example, the interface can include "View Attachments" links associated with each review item. As a result, users can easily access supporting documents or additional context related to specific review items directly from the interface.

In some implementations, the review interface 900 can include functionality for creating new review comments. For example, the interface can provide a "Create Comment" button that, when activated, can open a comment creation form. By incorporating this feature, the review interface 900 can enable users to provide feedback or initiate discussions about specific review items directly within the platform. In some implementations, a review interface 900 can be configured to display a secondary interface 902 in response to user activation of the comment creation form. For example, the interface 900 can redirect a user that selects the "Create Comment" button to a separate interface (e.g., a separate webpage) for creating and submitting review comments. For example, the displayed secondary interface 902 can include input fields for entering a title, selecting an entity, and identifying an analyst associated with the comment.

In some implementations, the secondary interface 902 can include a comment input field 930 for submitting/receiving user review feedback. For example, the interface can provide a text box where users can type detailed comments or observations about a specific review item. In a non-limiting example, the comments input area can include a character counter indicating the remaining available characters, helping users manage the length of their feedback.

In some implementations, the secondary interface 902 can incorporate file attachment capabilities. For example, the interface can include a file attachment module (e.g., an integrated file navigation and upload interface), enabling users to attach supporting documents or additional evidence to their review comments. Accordingly, users can provide comprehensive feedback by combining textual comments with relevant supplementary materials.

In some implementations, the secondary interface 902 can include a submission mechanism for finalizing and recording review comments. For example, the interface can provide a "Create" button that, when activated, can submit the entered comment and any attached files to the signal evaluation platform 200. As a result, the submitted feedback can be stored in the computing database 204 as part of the service data structures 250, making the information available for future reference and analysis.

In some implementations, the signal evaluation platform 200 can receive user feedback data comprising adjustments to contents of the generated response via the review interfaces 900 and 902. For example, when a user submits a review comment through the review interface 902, the interactive report engine 225 can process the feedback and update the relevant digital artifact records 251 or historical dialogue records 256. In a non-limiting example, if a user provides corrections or additional context to a generated response from the generative assistant interface 800, the signal evaluation platform 200 can incorporate this feedback to improve future responses.

In some implementations, the signal evaluation platform 200 can receive a user-validated narrative describing identified data fluctuation patterns through the review interfaces 900 and 902. For example, a user can submit a detailed explanation of observed trends or anomalies in financial data using the comment creation form in the review interface 902. As an illustrative example, an analyst can provide insights about the reasons behind significant changes in salary expenses across different reporting periods. By capturing these user-validated narratives, the signal evaluation platform 200 can enrich the context available for future analysis and reporting.

In some implementations, the review interfaces 900 and 902 can integrate with other components of the signal evaluation platform 200 to provide a comprehensive review and feedback system. For example, the interfaces can leverage data from the validation reports 253, differential reports 254, and informatics reports 255 stored in the computing database 204 to provide context for review items. Accordingly, the review interfaces 900 and 902 can serve as a central hub for users to analyze, comment on, and validate various aspects of the monitored system's operations and performance, facilitating collaborative review processes within the organization.

FIG. 10 is a block diagram that illustrates an example graphical user interface 1000 ("interface 1000") that demonstrates aspects of a query repository of the signal evaluation platform in accordance with some implementations of the present technology. Interface 1000 is implemented using components of the example computer environment 100 illustrated and described in more detail with reference to FIG. 1. Likewise, implementations of interface 1000 can include different and/or additional components or can be connected in different ways. Interface 1000 is a visual interface that enables users to interact with electronic devices using graphical elements (e.g., windows, icons, buttons, and/or the like) rather than text-based commands.

In some implementations, the interface 1000 can include a filter interface 1010 that enables users to select specific entity, year, and quarter parameters to customize the displayed information. For example, the interface 1000 can present a filter interface 1010 that includes dropdown menus enabling users to select a specific entity, year, and/or quarter parameters. Accordingly, users can customize the displayed information to focus on query entries 1020 associated with digital artifact records (e.g., financial statements) and/or entities (e.g., an enterprise group, an analyst, a reviewer, and/or the like) of specific organizational units and reporting periods.

In some implementations, the interface 1000 can display multiple query entries 1020 comprising regulatory reporting information. For example, the interface can present an enumerated list of query entries 1020, where each query entry comprises a prior natural-language query (e.g., a previous query submitted by an analyst and/or reviewer) and a corresponding accepted natural-language response (e.g., user validated response to previous query). As shown in FIG. 10, the interface 1000 can display the query entries 1020 in an expandable/collapsible format. In a non-limiting example, each query entry can show detailed information associated with stored digital artifact records (e.g., uncollected premiums, management agreements, and/or financial ratios of financial statements).

In some implementations, the query repository interface 1000 can provide response fields associated with each query entry. For example, these fields can enable users to document explanations and analysis results directly within the interface. As a result, the query repository interface 1000 can facilitate comprehensive documentation of regulatory reporting processes and outcomes.

In some implementations, the signal evaluation platform 200 can determine at least one historical dialogue record using a received natural-language query. For example, the generative dialogue engine 224 can analyze the query to identify similar past queries stored in the historical dialogue records 256. In a non-limiting example, if a user submits a query about uncollected premiums, the system can retrieve historical records of similar queries and their corresponding responses. By leveraging these historical dialogue records, the query repository interface 1000 can provide context-aware responses to user queries.

In some implementations, the alphanumeric responses displayed in the query repository interface 1000 can comprise content elements corresponding to portions of at least one reference performance differential report. For example, when responding to a query about financial ratios, the system can incorporate relevant data and analysis from previously generated differential reports 254. As an illustrative example, a response to a query about changes in a specific financial ratio can include excerpts from past performance differential reports that discuss similar trends or fluctuations. Accordingly, the query repository interface 1000 can provide users with comprehensive responses that draw upon historical analysis and reporting.

In some implementations, the query repository interface 1000 can enable users to expand individual query entries to reveal additional details. For example, users can interact with expandable sections within each query entry to access more in-depth information or analysis. As a result, the interface can maintain an organized view of all queries while enabling users to drill down into specific areas of interest.

In some implementations, the query repository interface 1000 can integrate with other components of the signal evaluation platform 200 to enhance its functionality. For example, the interface can leverage data from the validation reports 253, differential reports 254, and informatics reports 255 stored in the computing database 204 to provide comprehensive responses to user queries. By combining data from multiple sources, the query repository interface 1000 can offer users a holistic view of regulatory reporting information and analysis.

Example Control Flow

Figure 11:
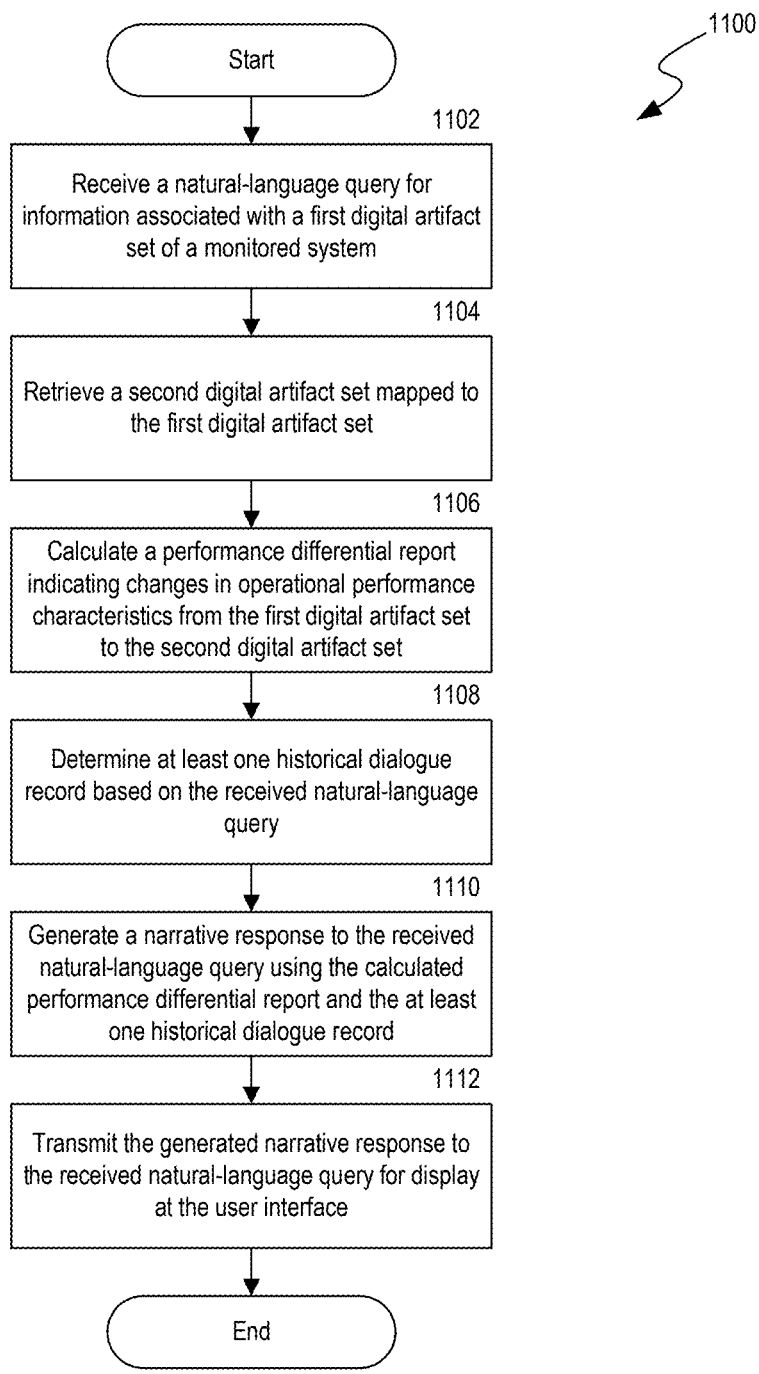
FIG. 11 is a flow diagram that illustrates an example process for evaluating digital artifact signals in accordance with some implementations of the disclosed technology.

FIG. 11 is a flow diagram that illustrates an example process 1100 for evaluating digital artifact signals in accordance with some implementations of the disclosed technology. The process 1100 can be performed by a system (e.g. signal evaluation platform 200) configured to calculate a performance differential report (e.g., observed changes to operational performance characteristics, a flux analysis artifact, and/or the like) via comparing alphanumeric signal data between digital artifact sets associated with a monitored system (e.g., computing lifecycle management, regulatory insurance reporting, statutory financial reporting cycles, and/or the like). In one example, the system includes at least one hardware processor and at least one non-transitory memory storing instructions, which, when executed by the at least one hardware processor, cause the system to perform the process 1100. In another example, the system includes a non-transitory, computer-readable storage medium comprising instructions recorded thereon, which, when executed by at least one data processor, cause the system to perform the process 1100.

At block 1102, the system can receive natural-language queries for requesting information associated with one or more digital artifacts associated with a monitored system. For example, the system can receive a user-initiated request from a digital interface (e.g., a conversational chat room, a request submission webpage, and/or the like) that includes a text-based prompt for analytical information (e.g., informatics data, fluctuations in operational performance characteristics, and/or the like) based on select digital artifacts (e.g., executable firmware output results, network traffic data, financial documentation) captured during, or after, observation of a monitored system (e.g., a computing lifecycle management service, a telecommunications network provider, a regulatory insurance reporting system, a statutory financial reporting cycle, and/or the like). In some implementations, the system can receive, from the user interface, supplementary data structures that provide additional context information for the user requested natural-language queries. For example, the system can receive one or more digital artifacts (e.g., financial statements of an enterprise) as complementary attachments to a natural-language query for performance informatics (e.g., flux analysis of financial data) associated with a regulatory financial reporting system (e.g., a statutory insurance reporting cycle/management platform).

In some implementations, the system can identify a digital artifact set associated with the monitored system based on the one or more received natural-language queries. As an illustrative example, the system can analyze the text-based contents of the natural-language queries to extract identifiable characteristics (e.g., an document name, a reference link, an author, a keyword/tag, a database storage location, and/or the like) corresponding to one or more digital artifacts (e.g., digital documentation, financial statements, and/or the like) associated with the monitored system. Accordingly, the system can selectively identify a digital artifact set comprising of digital artifacts that satisfy one or more of the extracted identifiable characteristics. In additional or alternative implementations, the system can perform a comparative analysis to identify digital artifacts that comprise similar content information with respect to the input natural-language query. For example, the system can generate embedded identifiers (e.g., standardized numerical vectors, attribute-value data structures, and/or the like) that uniquely characterizes the text contents of the natural-language query and/or the alphanumeric signals of the stored digital artifacts (e.g., structured alphanumeric signals indicating performance characteristics of the monitored system). In some implementations, the system can use a machine learning model (e.g., a large language model, a natural-language processing algorithm, a statistical inferencing model, and/or the like) to convert the raw alphanumeric signal data of the natural-language query and/or the digital artifact into a unique standardized representation (e.g., an embedded identifier) for the natural-language query and/or the digital artifact. Accordingly, the system can compare the standardized embedding identifiers of the natural-language query and digital artifacts of the monitored system using statistical evaluation techniques (e.g., cosine similarity, Euclidean distance, and/or the like) to selectively identify digital artifacts corresponding to embedded identifiers satisfying a similarity threshold (e.g., static and/or dynamic) with the embedded identifier of the natural-language query.

In some implementations, the system can receive natural-language queries for information associated with digital artifacts (e.g., executable output documentation, financial statements, and/or the like) that correspond to specific time intervals and/or timestamps. For example, the system can receive (e.g., via a digital user interface) a natural-language request to generate analytical information (e.g., informatics data, flux analysis reports, and/or the like) for one or more select digital artifacts of the monitored system that are recorded within a specific timestamp, or a plurality of timestamps (e.g., a standard fiscal cycle period). In some implementations, the system can be configured to store the one or more digital artifacts associated with the monitored system in groupings based on the timestamps associated with each digital artifact. For example, the system can store (e.g., at a dedicated database partition) a first digital artifact set that corresponds to a first time interval and a second digital artifact set that corresponds to a second time interval.

In some implementations, the system can receive validation parameters for evaluating compliance for alphanumeric signals of digital artifacts associated with the monitored system. For example, the system can receive (e.g., via a digital user interface, an Application Programming Interface (API), and/or the like) one or more validation parameters (e.g., validation data schemas, executable signal evaluation functions, natural-language rulesets, and/or the like) that represent and/or indicate specific compliance requirements for the structured alphanumeric signal contents of the stored digital artifacts (e.g., monitored key performance indicators (KPIs), line items and/or elements of financial statements, and/or the like). Accordingly, the system can determine compliance of individual digital artifacts of the monitored system via comparing, or evaluating, the individual alphanumeric signal contents (e.g., of each digital artifact) with the validation parameter set. As an illustrative example, the system can receive a plurality of validation rules set by a third-party insurance regulatory entity (e.g., the National Association for Insurance Commissioners (NAIC)) for evaluating compliance of financial statements (e.g., validity of submitted, or recorded, line items) with statutory reporting standards (e.g., model laws and/or regulations, shared best practices, and/or the like). In the foregoing example, the system can iteratively evaluate each validation rule with the corresponding line item of financial statements (e.g., associated with the monitored system) to determine whether the financial statements comply with the plurality of validation rules. In some implementations, the system can be configured to identify a subset of validation parameters that are satisfied (or not satisfied) by the corresponding alphanumeric signal contents (e.g., financial statement line items) of the digital artifacts. In additional or alternative implementations, the system can receive compliance results (e.g., validation rules satisfied by alphanumeric signal data of digital artifacts) as output results from external validation services (e.g., a third-party statutory reporting software).

In some implementations, the system can automatically modify the alphanumeric signal data of erroneous, or invalid, digital artifacts (e.g., adjustment of financial statement line item values). For example, the system can determine, for a select digital artifact of the monitored system, at least one validation parameter that is not satisfied by the structured alphanumeric signal content (or alphanumeric signal subset) of the select digital artifact (or digital artifact set). In response, the system can identify one or more error resolution records (e.g., historical troubleshoot documentation, structured attribute-value data structures, and/or the like) that detail corrective adjustments to alphanumeric signal data (e.g., modifications to financial statement line items) of prior digital artifacts for addressing similar validation failures to the current select digital artifact (e.g., validation failures similar to the at least one unsatisfied validation parameter). For example, the system can search a database for stored error resolution records with embedded content identifiers that share significant similarity to an embedded content identifier of the select digital artifact. In a non-limiting example, the system can retrieve (e.g., from a stored database 204) one or more attribute-value data structures comprising an anomalous alphanumeric signal (of a previously evaluated digital artifact) indicating similar contents to the alphanumeric signal data (of the select digital artifact) that fails to satisfy the at least one validation parameter and an adjusted signal format (e.g., a series of signal transformation operations, a corrected statement line item, and/or the like) that modifies and/or enables the anomalous alphanumeric signal to satisfy the at least one validation parameter. Accordingly, the system can modify the structured alphanumeric signal data of the select digital artifact to match the adjusted signal format of the identified error resolution records. In some implementations, the system can use a machine learning model (e.g., a large language model, a natural-language algorithm, a statistical inference model) to transform the input alphanumeric signal data of the select digital artifact to the modified output signal data based on the adjusted signal format.

In some implementations, the system can access validation models (e.g., executable functions, deterministic inference models, classification algorithms, and/or the like) that are each configured to evaluate compliance of structured alphanumeric signals (of digital artifacts) to one or more validation parameters for digital artifacts of a monitored system. For example, the system can retrieve (e.g., from a stored database 204) a suite of validation models such that each model is configured to evaluate compliance of a select digital artifact (or subset of alphanumeric signals thereof) with a subset of validation parameters assigned to the digital artifact. In some implementations, a plurality of distinct validation models can be configured to evaluate compliance of the same validation parameter. The system can identify at least one validation model (e.g., from the suite of validation models) configured to evaluate compliance of the digital artifact (e.g., alphanumeric signal data) for each validation parameter. Accordingly, the system can use the identified validation model to predict a compliance measure (e.g., a classification level, a numerical score, and/or the like) for the alphanumeric signal data of the select digital artifact.

At block 1104, the system can retrieve a complementary collection of digital artifacts (e.g., a second digital artifact set) for the one or more digital artifacts (e.g., a first digital artifact set) associated with the initial natural-language queries. For example, the system can selectively identify one or more digital artifacts of the monitored system that comprises an embedded relation and/or link with digital artifacts of the first digital artifact set. In a non-limiting example, the system can identify a subset of digital artifacts that are stored in the same, or approximate, storage locations (e.g., partitions within database 204) as the digital artifacts of the first digital artifact set. In another non-limiting example, the system can identify stored digital artifacts that are assigned the same, or similar composition of, user permissions and/or authorized users as the digital artifacts of the first digital artifact set. In another non-limiting example, the system can identify a stored hierarchical mapping (e.g., a parent-child relationship, a sequential relationship, and/or the like) that links the digital artifacts of the first digital artifact to other stored digital artifacts of the monitored system. Accordingly, in the foregoing example, the system can identify the second digital artifact set as the digital artifacts mapped to the first digital artifact set. In some implementations, the system can identify subgroups of digital artifacts that are mapped (e.g., via the stored hierarchical mapping) to the first digital artifact set. For example, the system can identify a subset of digital artifacts mapped to the first digital artifact set where each digital artifact of the subset comprises alphanumeric signal data indicating recorded information of the monitored system (e.g., prior performance characteristics) at a specified time interval and/or timestamp (e.g., at a second time interval prior to the first time interval of the first digital artifact set).

At block 1106, the system can calculate a performance differential report (e.g., a flux analysis report) indicating changes to operational performance characteristics of the digital artifacts associated with the monitored system. The system can compare the structured alphanumeric signal data of the first digital artifact set and the second digital artifact set to determine significant operational performance characteristics, or changes thereof, from the first to the second digital artifact set (or vice versa). As an illustrative example, the system can select a first digital artifact (e.g., a financial statement for the current fiscal year) from the first digital artifact set and a corresponding second digital artifact (e.g., a financial statement for the previous fiscal year) from the second digital artifact set such that alphanumeric signal elements of the first digital artifact map to alphanumeric signal elements of the second digital artifact (e.g., same and/or similar line items between financial statements). Accordingly, the system can iteratively compare each alphanumeric signal element (e.g., financial statement line item) of the first digital artifact to the mapped alphanumeric signal element of the second digital artifact to determine an operational performance characteristic (e.g., a proportion increase/decrease, a surplus/deficit, an anomaly, an error, and/or the like) and/or a change thereof (e.g., a line item delta). In some non-limiting examples, the system can execute pre-defined functions (e.g., stored scripts and/or programs) to perform the differential analysis between the first and the second digital artifact sets. In other non-limiting examples, the system can use machine learning models (e.g., a classification/regression model, a large language model, a statistical inference model, a deep-learning model, and/or the like) to generate the comparative output results. The system can store the calculated operational performance characteristics, or changes thereof, as a structured performance differential report (e.g., attribute-value pairs, a relational table, a graph, and/or the like).

In some implementations, the system can identify data fluctuation patterns between the alphanumeric signal data of the first and the second digital artifact sets. For example, the system can monitor and/or identify significant changes to operational characteristics (e.g., financial statement line item deltas that exceed a specified threshold, constant ratios between two or more line item values, and/or the like) between the first and the second digital artifact sets based on information calculated for, or extracted from, the performance differential report. In additional or alternative implementations, the system can generate supplementary alphanumeric signal data (e.g., human-readable narratives) that describe and/or elaborates the identified data fluctuation patterns (e.g., explanation of cause of identified data fluctuation). For example, the system can retrieve (e.g., from a stored database 204) one or more recorded supplemental alphanumeric signals corresponding to user-validated human-readable narratives describing prior data fluctuation patterns identified within prior performance differential reports. Accordingly, the system can cause a machine learning model (e.g., a natural-language algorithm, a large language model, and/or the like) to create a supplemental alphanumeric signal (e.g., a narrative response) describing the identified fluctuation patterns of the performance differential report based on the recorded supplemental alphanumeric signal. The system can further transmit, for display at a user interface, the supplemental narrative response alongside the generated response to the received natural-language query, as further described herein.

In some implementations, the system can identify anomalous data fluctuation patterns from the identified data fluctuation patterns of the performance differential report. For example, the system can selectively identify at least one anomalous data fluctuation pattern that fails to satisfy a tolerance threshold (e.g., an outlier measure) set for data fluctuation patterns of the performance differential report. In a non-limiting manner, examples of identified anomalous data fluctuation patterns can include a resource expenditure, a resource allocation, a risk assessment, an asset indemnity, and/or comparative constants for performance metrics. In additional or alternative implementations, the system can retrieve anomalous signal records for prior performance differential reports (e.g., historical outlier measures for prior flux analysis reports). For example, the system can retrieve (e.g., from a stored database 204) one or more records comprising a recorded data fluctuation pattern similar to the at least one anomalous data fluctuation pattern of the calculated performance differential report and/or at least one identified source of the recorded data fluctuation pattern within the digital artifacts used to generate the prior performance differential reports. Accordingly, the system can use the retrieved anomalous signal records to identify one or more candidate sources (e.g., select alphanumeric signal elements of digital artifacts, specific financial statement line items, and/or the like) of the at least one anomalous data fluctuation pattern within the first and the second digital artifact set. For example, the system can input the retrieved anomalous signal records, the data fluctuation patterns of the first and the second digital artifact sets, and/or the structured alphanumeric signal data of the first and the second digital artifact sets into a machine learning model (e.g., a large language model, a natural-language algorithm, a statistical inference model, and/or the like) to identify one or more candidate sources from the first and the second digital artifacts. The system can transmit, for display at a user interface, the identified one or more candidate sources of the at least one anomalous data fluctuation pattern.

In some implementations, the system can generate and transmit, for display at a user interface, a hierarchical map for the one or more identified data fluctuation patterns of the performance differential report. For example, the system can generate a plurality of interactive visual elements (e.g., a selectable button and/or widget) that are interconnected to form a hierarchical map of data patterns associated with the performance differential report. In some implementations, the system can configure the visual hierarchical map to display a distinctive visual marking for the interactive visual element corresponding to anomalous data fluctuation patterns.

At block 1108, the system can determine at least one historical dialogue record (e.g., a data structure comprising turn-based text-prompts and/or conversational dialogue) that provides contextual metadata for the received natural-language queries. The system can identify (e.g., from a storage database 204) one or more historical dialogue records that comprise a natural-language query set representing prior requests for information associated with digital artifacts of the monitored system, such that the prior natural-language queries of the historical dialogue records satisfy a content similarity (e.g., text-content adjacency) with the received natural-language queries. In a non-limiting example, the system can generate an embedded identifier (e.g., a standardized numerical vector, an attribute-value data structure, and/or the like) for the received natural-language queries and the prior natural-language queries of candidate historical dialogue records. Accordingly, the system can selectively identify historical dialogue records comprising natural-language queries with embedded identifiers that satisfy a similarity threshold with respect to the embedded identifiers of the received natural-language queries. In some implementations, the system can retrieve historical dialogue records that each comprise an alphanumeric response set (e.g., corresponding to the natural-language query set) indicating prior formatted responses to natural-language queries of the natural-language query set.

At block 1110, the system can cause a generative machine learning model (e.g., a large language model, a natural-language algorithm, a statistical inference model, and/or the like) to generate a human-readable narrative response (e.g., an alphanumeric text string) to the received natural-language queries using the calculated performance differential report and the at least one historical dialogue record. For example, the system can generate and input a custom alphanumeric signal (e.g., a natural-language prompt) into the generative model, which causes the model to create the narrative response to the natural-language queries. The custom alphanumeric signal can comprise a context-rich prompt that instructs the generative model to evaluate the received natural-language queries based on one or more components of the performance differential report and/or the historical dialogue records. As an illustrative example, the system can generate the custom prompt "Based on the performance differential report showing a 10% increase in total operating revenue and a 5% decrease in total operating expenses, and considering previous queries and responses (e.g., 'What are the causes of increased operating revenue?', 'How does operating expenses affect performance?'), generate a narrative response explaining the potential reasons for these changes and their implications," which provides additional context information to the initial natural-language queries using information from the calculated performance differential report and the historical dialogue records. Accordingly, the system can input the custom alphanumeric signal into the generative model to generate the human-readable narrative response.

In some implementations, the system can further cause the generative model to generate the human-readable narrative response in accordance with a specified evaluation configuration. In a non-limiting example, the system can fine-tune the generative model on a generalized knowledge base and/or database (e.g., with no discernable relation to digital artifacts of the monitored system) and subsequently prompt the model to generate the narrative response without additional specific examples or training data related to the performance differential report or historical dialogue records (e.g., zero-shot learning). In another non-limiting example, the system can provide the generative model with a single example of a narrative response to a single natural-language query that is similar to the received natural-language queries, such that the model can generate a response based on that example. For instance, the system can input the custom prompt "Example Response: 'The 10% increase in operational revenue is likely due to increases in premiums earned, while the 5% decrease in operating expenses can be attributed to the recent enterprise optimization projects.' Generate a similar response for the current performance differential report," which provides the model with additional context information based on a single historical example (e.g., one-shot learning). Similarly, the system can also provide the generative model with a plurality of example narrative responses, such that the model can learn response patterns and generate the human-readable response based on those examples. In another non-limiting example, the system can configure the generative model to retrieve relevant historical dialogue records and performance differential reports from a stored database 204, and subsequently generate a response based on the retrieved information. For instance, the system can input the prompt "Retrieve historical dialogue records comprising queries and responses related to system throughput and latency. Use the retrieved records to generate a narrative response explaining the potential causes and implications of the current performance differential report." In some implementations, the system can generate embedded content identifiers for the historical dialogue records, the performance differential reports, and/or the natural-language queries to enable efficient and accurate retrieval of relevant context information (e.g., Retrieval-Augmented Generation (RAG)). In additional or alternative implementations, the system can use any combination of the foregoing configurations of the generative model to generate a narrative response.

In some implementations, the system can cause the generative machine learning model to generate the response to the received natural-language queries based, at least in part, on at least one reference performance differential report and the calculated performance differential report. In additional or alternative implementations, the system can use a generative model that is trained on a custom dataset comprising performance differential reports, historical dialogue records, and corresponding narrative responses.

At block 1112, the system can transmit, for display at a user interface, the generated narrative response to the received natural-language queries. In some implementations, the system can receive (e.g., from the user interface) a user-validated narrative describing data fluctuation patterns identified from the calculated performance differential report. In the foregoing example, the system can further configure the generative machine learning model to generate a supplementary narrative response (e.g., human-readable narrative for the identified data fluctuations) based, at least in part, on the received user-validated narrative. In additional or alternative implementations, the system can receive (e.g., from the user interface) user feedback data comprising at least one adjustment (e.g., a revised natural-language narrative) to contents of the generated response to the natural-language queries. Accordingly, the system can retrain the generative machine learning model based on the received natural-language queries, the generated response to the natural-language queries, and the at least one adjustment to contents of the generated response.

Example Machine Learning Architecture

Figure 12:
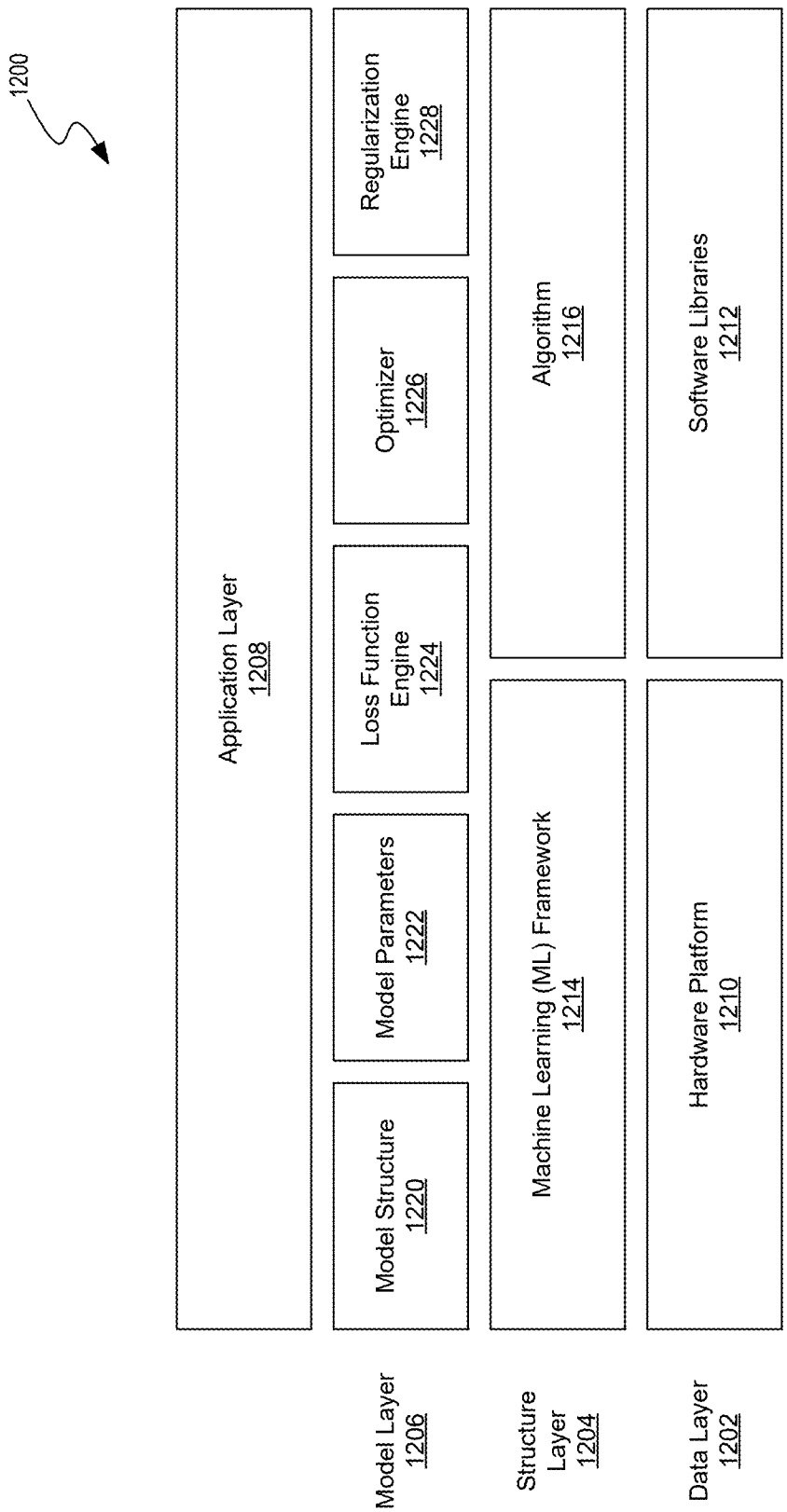
FIG. 12 illustrates a layered architecture of an artificial intelligence (AI) system that can implement the ML models of the signal evaluation platform in accordance with some implementations of the present technology.

FIG. 12 illustrates a layered architecture of an artificial intelligence (AI) system 1200 that can implement the ML models of the signal evaluation platform 200 of FIG. 2, in accordance with some implementations of the present technology. Example ML models can include one or more executable statistical inference algorithms stored at computing databases 115, 125 and/or retrieved from external service providers (e.g., a third-party cloud host) via the network 130 of the example computing environment 100. Accordingly, the computing environment 100 and/or components thereof (e.g., servers 110, 120, databases 115, 125, network 130, and/or the like) can include, or be incorporated within, one or more components of the AI system 1200. The AI system 1200 provides a comprehensive software stack capable of hosting suitable runtime environments for one or more operations of ML models, as further described herein.

As shown, the AI system 1200 can include a set of layers, which conceptually organize elements within an example network topology for the AI system's architecture to implement a particular AI model. Generally, an AI model is a computer-executable program implemented by the AI system 1200 that analyses input data to generate inferential output data (e.g., a classification label for input feature vectors). Information can pass through each layer of the AI system 1200 to generate outputs for the AI model. The layers can include a data layer 1202, a structure layer 1204, a model layer 1206, and an application layer 1208. The algorithm 1216 of the structure layer 1204 and the model structure 1220 and model parameters 1222 of the model layer 1206 together form an example AI model. The optimizer 1226, loss function engine 1224, and regularization engine 1228 work to refine and optimize the AI model, and the data layer 1202 provides resources and support for application of the AI model by the application layer 1208.

The data layer 1202 acts as the foundation of the AI system 1200 by preparing data for the AI model. As shown, the data layer 1202 can include two sub-layers: a hardware platform 1210 and one or more software libraries 1212. The hardware platform 1210 can be designed to perform operations for the AI model and include computing resources for storage, memory, logic and networking, such as the resources described in relation to FIGS. 1 and 14. The hardware platform 1210 can process amounts of data using one or more servers. The servers can perform backend operations such as matrix calculations, parallel calculations, machine learning (ML) training, and the like. Examples of servers used by the hardware platform 1210 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1210 can include computing resources, (e.g., servers, memory, etc.) offered by a cloud services provider. The hardware platform 1210 can also include computer memory for storing data about the AI model, application of the AI model, and training data for the AI model. The computer memory can be a form of random-access memory (RAM), such as dynamic RAM, static RAM, and non-volatile RAM.

The software libraries 1212 can be thought of suites of data and programming code, including executables, used to control the computing resources of the hardware platform 1210. The programming code can include low-level primitives (e.g., fundamental language elements) that form the foundation of one or more low-level programming languages, such that servers of the hardware platform 1210 can use the low-level primitives to carry out specific operations. The low-level programming languages do not require much, if any, abstraction from a computing resource's instruction set architecture, enabling them to run quickly with a small memory footprint. Examples of software libraries 1212 that can be included in the AI system 1200 include INTEL Math Kernel Library, NVIDIA cuDNN EIGEN, and OpenBLAS.

The structure layer 1204 can include an ML framework 1214 and an algorithm 1216. The ML framework 1214 can be thought of as an interface, library, or tool that enables users to build and deploy the AI model. The ML framework 1214 can include an open-source library, an application programming interface (API), a gradient-boosting library, an ensemble method, and/or a deep learning toolkit that work with the layers of the AI system facilitate development of the AI model. For example, the ML framework 1214 can distribute processes for application or training of the AI model across multiple resources in the hardware platform 1210. The ML framework 1214 can also include a set of pre-built components that have the functionality to implement and train the AI model and enable users to use pre-built functions and classes to construct and train the AI model. Thus, the ML framework 1214 can be used to facilitate data engineering, development, hyperparameter tuning, testing, and training for the AI model. Examples of ML frameworks 1214 that can be used in the AI system 1200 include TENSORFLOW, PYTORCH, SCIKIT-LEARN, KERAS, LightGBM, RANDOM FOREST, and AMAZON WEB SERVICES.

The algorithm 1216 can be an organized set of computer-executable operations used to generate output data from a set of input data and can be described using pseudocode. The algorithm 1216 can include complex code that enables the computing resources to learn from new input data and create new/modified outputs based on what was learned. In some implementations, the algorithm 1216 can build the AI model through being trained while running computing resources of the hardware platform 1210. This training enables the algorithm 1216 to make predictions or decisions without being explicitly programmed to do so. Once trained, the algorithm 1216 can run at the computing resources as part of the AI model to make predictions or decisions, improve computing resource performance, or perform tasks. The algorithm 1216 can be trained using supervised learning, unsupervised learning, semi-supervised learning, and/or reinforcement learning.

Using supervised learning, the algorithm 1216 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include alphanumeric signal data (e.g., of digital artifacts), historical dialogue records, performance differential reports, and/or natural-language queries/responses of the signal evaluation platform 200 described in relation to FIG. 2. The user may label the training data based on one or more classes and trains the AI model by inputting the training data into the algorithm 1216. The algorithm determines how to label the new data based on the labeled training data. The user can facilitate collection, labeling, and/or input via the ML framework 1214. In some instances, the user may convert the training data to a set of feature vectors for input to the algorithm 1216. Once trained, the user can test the algorithm 1216 on new data to determine if the algorithm 1216 is predicting accurate labels for the new data. For example, the user can use cross-validation methods to test the accuracy of the algorithm 1216 and retrain the algorithm 1216 on new training data if the results of the cross-validation are below an accuracy threshold.

Supervised learning can involve classification and/or regression. Classification techniques involve teaching the algorithm 1216 to identify a category of new observations based on training data and are used when input data for the algorithm 1216 is discrete. Said differently, when learning through classification techniques, the algorithm 1216 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1216 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1216 is continuous. Regression techniques can be used to train the algorithm 1216 to predict or forecast relationships between variables. To train the algorithm 1216 using regression techniques, a user can select a regression method for estimating the parameters of the model. The user collects and labels training data that is input to the algorithm 1216 such that the algorithm 1216 is trained to understand the relationship between data features and the dependent variable(s). Once trained, the algorithm 1216 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1216 learns patterns from unlabeled training data. In particular, the algorithm 1216 is trained to learn hidden patterns and insights of input data, which can be used for data exploration or for generating new data. Here, the algorithm 1216 does not have a predefined output, unlike the labels output when the algorithm 1216 is trained using supervised learning. Said another way, unsupervised learning is used to train the algorithm 1216 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters comprise dissimilar data. For example, during clustering, data with possible similarities remains in a group that has less or no similarities to another group. Examples of clustering techniques density-based methods, hierarchical based methods, partitioning methods, and grid-based methods. In one example, the algorithm 1216 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1216 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 1216 include factor analysis, item response theory, latent profile analysis, and latent class analysis.

The model layer 1206 implements the AI model using data from the data layer and the algorithm 1216 and ML framework 1214 from the structure layer 1204, thus enabling decision-making capabilities of the AI system 1200. The model layer 1206 includes a model structure 1220, model parameters 1222, a loss function engine 1224, an optimizer 1226, and a regularization engine 1228.

The model structure 1220 describes the architecture of the AI model of the AI system 1200. The model structure 1220 defines the complexity of the pattern/relationship that the AI model expresses. Examples of structures that can be used as the model structure 1220 include decision trees, support vector machines, regression analyses, Bayesian networks, Gaussian processes, genetic algorithms, and artificial neural networks (or, simply, neural networks). The model structure 1220 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1220 may include one or more hidden layers of nodes between the input and output layers. The model structure 1220 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1222 represent the relationships learned during training and can be used to make predictions and decisions based on input data. The model parameters 1222 can weight and bias the nodes and connections of the model structure 1220. For instance, when the model structure 1220 is a neural network, the model parameters 1222 can weight and bias the nodes in each layer of the neural networks, such that the weights determine the strength of the nodes and the biases determine the thresholds for the activation functions of each node. The model parameters 1222, in conjunction with the activation functions of the nodes, determine how input data is transformed into desired outputs. The model parameters 1222 can be determined and/or altered during training of the algorithm 1216.

The loss function engine 1224 can determine a loss function, which is a metric used to evaluate the AI model's performance during training. For instance, the loss function engine 1224 can measure the difference between a predicted output of the AI model and the actual output of the AI model and is used to guide optimization of the AI model during training to minimize the loss function. The loss function may be presented via the ML framework 1214, such that a user can determine whether to retrain or otherwise alter the algorithm 1216 if the loss function is over a threshold. In some instances, the algorithm 1216 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1226 adjusts the model parameters 1222 to minimize the loss function during training of the algorithm 1216. In other words, the optimizer 1226 uses the loss function generated by the loss function engine 1224 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1226 used may be determined based on the type of model structure 1220 and the size of data and the computing resources available in the data layer 1202.

The regularization engine 1228 executes regularization operations. Regularization is a technique that prevents over- and under-fitting of the AI model. Overfitting occurs when the algorithm 1216 is overly complex and too adapted to the training data, which can result in poor performance of the AI model. Underfitting occurs when the algorithm 1216 is unable to recognize even basic patterns from the training data such that it cannot perform well on training data or on validation data. The optimizer 1226 can apply one or more regularization techniques to fit the algorithm 1216 to the training data properly, which helps constraint the resulting AI model and improves its ability for generalized application. Examples of regularization techniques include lasso (L1) regularization, ridge (L2) regularization, and elastic (L1 and L2 regularization).

The application layer 1208 describes how the AI system 1200 is used to solve problem or perform tasks. In an example implementation, the application layer 1208 can be communicatively coupled (e.g., display application data, receive user input, and/or the like) to an interactable user interface of the signal evaluation platform 200 of FIG. 2.

Example Transformer for Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural-language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural-language processing (NLP) tasks. A language model may be trained to model how words relate to each other in a textual sequence, based on probabilities. A language model may comprise hundreds of thousands of learned parameters or in the case of a large language model (LLM) may comprise millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 13:
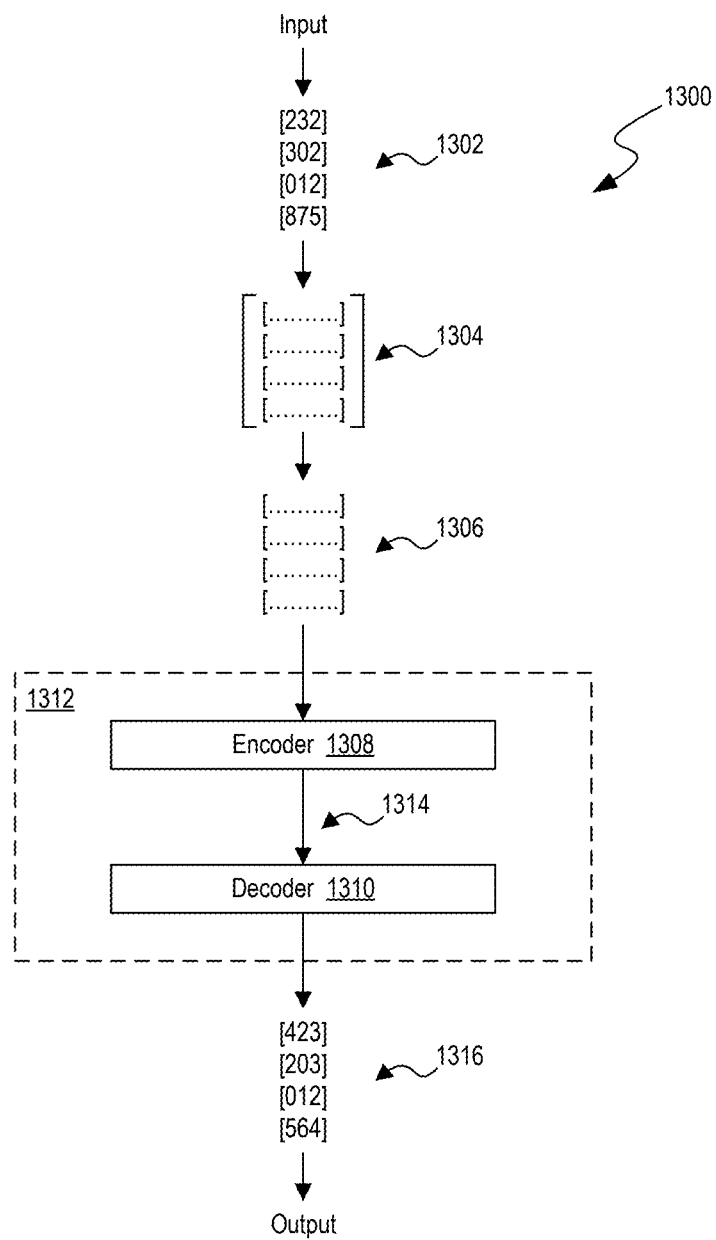
FIG. 13 is a block diagram of an example transformer that can implement aspects of the present technology.

FIG. 13 is a block diagram of an example transformer 1312 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1312 includes an encoder 1308 (which can comprise one or more encoder layers/blocks connected in series) and a decoder 1310 (which can comprise one or more decoder layers/blocks connected in series). Generally, the encoder 1308 and the decoder 1310 each include a plurality of neural network layers, at least one of which can be a self-attention layer. The parameters of the neural network layers can be referred to as the parameters of the language model.

The transformer 1312 can be trained to perform certain functions on a natural-language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 1312 is trained to perform certain functions on other input formats than natural-language input. For example, the input can include objects, images, audio content, or video content, or a combination thereof.

The transformer 1312 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural-language responses to natural-language input). FIG. 13 illustrates an example of how the transformer 1312 can process textual input data. Input to a language model (whether transformer-based or otherwise) typically is in the form of natural-language that can be parsed into tokens. It should be appreciated that the term "token" in the context of language models and Natural-language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 13, a short sequence of tokens 1302 corresponding to the input text is illustrated as input to the transformer 1312. Tokenization of the text sequence into the tokens 1302 can be performed by some pre-processing tokenization module such as, for example, a byte-pair encoding tokenizer (the "pre" referring to the tokenization occurring prior to the processing of the tokenized input by the LLM), which is not shown in FIG. 13 for simplicity. In general, the token sequence that is inputted to the transformer 1312 can be of any length up to a maximum length defined based on the dimensions of the transformer 1312. Each token 1302 in the token sequence is converted into an embedding vector (also referred to simply as an embedding 1306). An embedding 1306 is a learned numerical representation (such as, for example, a vector) of a token that captures some semantic meaning of the text segment represented by the token 1302. The embedding 1306 represents the text segment corresponding to the token 1302 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 1306 corresponding to the "write" token will be closer to another embedding corresponding to the "jot down" token in the vector space as compared to the distance between the embedding 1306 corresponding to the "write" token and another embedding corresponding to the "summary" token.

The vector space can be defined by the dimensions and values of the embedding vectors. Various techniques can be used to convert a token 1302 to an embedding 1306. For example, another trained ML model can be used to convert the token 1302 into an embedding 1306. In particular, another trained ML model can be used to convert the token 1302 into an embedding 1306 in a way that encodes additional information into the embedding 1306 (e.g., a trained ML model can encode positional information about the position of the token 1302 in the text sequence into the embedding 1306). In some examples, the numerical value of the token 1302 can be used to look up the corresponding embedding in an embedding matrix 1304 (which can be learned during training of the transformer 1312).

The generated embeddings 1306 are input into the encoder 1308. The encoder 1308 serves to encode the embeddings 1306 into feature vectors 1314 that represent the latent features of the embeddings 1306. The encoder 1308 can encode positional information (i.e., information about the sequence of the input) in the feature vectors 1314. The feature vectors 1314 can have very high dimensionality (e.g., on the order of thousands or tens of thousands), with each element in a feature vector 1314 corresponding to a respective feature. The numerical weight of each element in a feature vector 1314 represents the importance of the corresponding feature. The space of all possible feature vectors 1314 that can be generated by the encoder 1308 can be referred to as the latent space or feature space.

Conceptually, the decoder 1310 is designed to map the features represented by the feature vectors 1314 into meaningful output, which can depend on the task that was assigned to the transformer 1312. For example, if the transformer 1312 is used for a translation task, the decoder 1310 can map the feature vectors 1314 into text output in a target language different from the language of the original tokens 1302. Generally, in a generative language model, the decoder 1310 serves to decode the feature vectors 1314 into a sequence of tokens. The decoder 1310 can generate output tokens 1316 one by one. Each output token 1316 can be fed back as input to the decoder 1310 in order to generate the next output token 1316. By feeding back the generated output and applying self-attention, the decoder 1310 is able to generate a sequence of output tokens 1316 that has sequential meaning (e.g., the resulting output text sequence is understandable as a sentence and obeys grammatical rules). The decoder 1310 can generate output tokens 1316 until a special [EOT] token (indicating the end of the text) is generated. The resulting sequence of output tokens 1316 can then be converted to a text sequence in post-processing. For example, each output token 1316 can be an integer number that corresponds to a vocabulary index. By looking up the text segment using the vocabulary index, the text segment corresponding to each output token 1316 can be retrieved, the text segments can be concatenated together, and the final output text sequence can be obtained.

In some examples, the input provided to the transformer 1312 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural-language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural-language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 14:
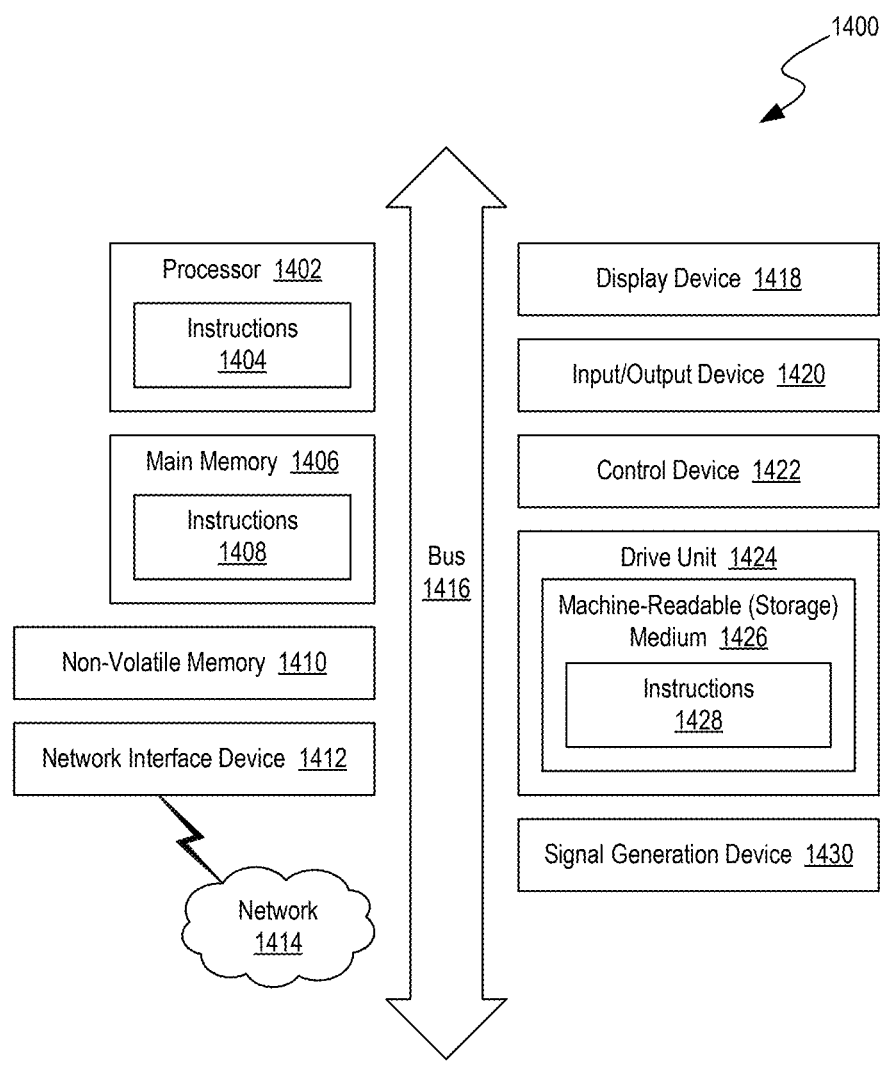
FIG. 14 is a block diagram that illustrates an example of a computer system in which at least some operations described herein can be implemented.

FIG. 14 is a block diagram that illustrates an example of a computer system 1400 in which at least some operations described herein can be implemented. As shown, the computer system 1400 can include: one or more processors 1402, main memory 1406, non-volatile memory 1410, a network interface device 1412, a video display device 1418, an input/output device 1420, a control device 1422 (e.g., keyboard and pointing device), a drive unit 1424 that includes a machine-readable (storage) medium 1426, and a signal generation device 1430 that are communicatively connected to a bus 1416. The bus 1416 represents one or more physical buses and/or point-to-point connections that are connected by appropriate bridges, adapters, or controllers. Various common components (e.g., cache memory) are omitted from FIG. 14 for brevity. Instead, the computer system 1400 is intended to illustrate a hardware device on which components illustrated or described relative to the examples of the figures and any other components described in this specification can be implemented.

The computer system 1400 can take any suitable physical form. For example, the computing system 1400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1400. In some implementations, the computer system 1400 can be an embedded computer system, a system-on-chip (SOC), a single-board computer system (SBC), or a distributed system such as a mesh of computer systems, or it can include one or more cloud components in one or more networks. Where appropriate, one or more computer systems 1400 can perform operations in real time, in near real time, or in batch mode.

The network interface device 1412 enables the computing system 1400 to mediate data in a network 1414 with an entity that is external to the computing system 1400 through any communication protocol supported by the computing system 1400 and the external entity. Examples of the network interface device 1412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1406, non-volatile memory 1410, machine-readable medium 1426) can be local, remote, or distributed. Although shown as a single medium, the machine-readable medium 1426 can include multiple media (e.g., a centralized/distributed database and/or associated caches and servers) that store one or more sets of instructions 1428. The machine-readable medium 1426 can include any medium that is capable of storing, encoding, or carrying a set of instructions for execution by the computing system 1400. The machine-readable medium 1426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in computing device(s). When read and executed by the processor 1402, the instruction(s) cause the computing system 1400 to perform operations to execute elements involving the various aspects of the disclosure.

Further Examples

In some implementations, the techniques described herein relate to a computer-implemented method for a signal evaluation platform, the method including receiving, via a user interface, a natural-language query for information associated with a first digital artifact set of a monitored system, each first digital artifact of the first digital artifact set including structured alphanumeric signals indicating performance characteristics of the monitored system at a first time interval. In some implementations, the method can include retrieving a second digital artifact set mapped to the first digital artifact set, each second digital artifact including structured alphanumeric signals indicating prior performance characteristics of the monitored system at a second time interval prior to the first time interval. In some implementations, the method can include calculating, using alphanumeric signals of the first and the second digital artifact sets, a performance differential report indicating change in one or more operational performance characteristics from the first digital artifact set to the second digital artifact set. In some implementations, the method can include determining, using the received natural-language query, at least one historical dialogue record including: (1) a natural-language query set indicating prior request for information associated with one or more digital artifacts of the monitored system, each natural-language query satisfying a similarity threshold in comparison to the received natural-language query, and (2) a corresponding alphanumeric response set indicating prior formatted responses to natural-language queries of the natural-language query set. In some implementations, the method can include causing a generative machine learning model to generate a narrative response to the received natural-language query using the calculated performance differential report and the at least one historical dialogue record. In some implementations, the method can include transmitting, for display at the user interface, the generated narrative response to the received natural-language query.

In some implementations, the method can include identifying, from the calculated performance differential report, one or more data fluctuation patterns between the structured alphanumeric signals of the first and the second digital artifact sets. In some implementations, the method can include retrieving a supplementary alphanumeric signal set corresponding to user-validated human-readable narratives describing data fluctuation patterns identified within prior performance differential reports. In some implementations, the method can include causing the generative machine learning model to generate, using the supplementary alphanumeric signal set, a supplemental narrative response describing the identified fluctuation patterns of the performance differential report. In some implementations, the method can include transmitting, for display at the user interface, the supplemental narrative response alongside the generated response to the received natural-language query.

In some implementations, the method can include receiving, from the user interface, a user-validated narrative describing the identified data fluctuation patterns of the calculated performance differential report. In some implementations, the method can include configuring the generative machine learning model to generate the supplementary narrative response based, at least in part, on the received user-validated narrative.

In some implementations, the one or more data fluctuation patterns of the performance differential report include at least one anomalous data fluctuation pattern that fails to satisfy a tolerance threshold. In some implementations, the method can include retrieving anomalous signal records for prior performance differential reports, each record including: (1) a recorded data fluctuation pattern similar to the at least one anomalous data fluctuation pattern of the calculated performance differential report, and (2) at least one identified source of the recorded data fluctuation pattern within the digital artifacts used to generate the prior performance differential reports. In some implementations, the method can include identifying, using a machine learning model, one or more candidate sources of the at least one anomalous data fluctuation pattern within the first and the second digital artifact set based on the retrieved anomalous signal records. In some implementations, the method can include transmitting, for display at the user interface, the identified one or more candidate sources of the at least one anomalous data fluctuation pattern.

In some implementations, the at least one anomalous data fluctuation pattern of the calculated performance differential report includes a resource expenditure, a resource allocation, a risk assessment, an asset indemnity, comparative constants for performance metrics, or a combination thereof.

In some implementations, the method can include transmitting, for display at the user interface, a hierarchical map of interactive visual elements corresponding to the one or more data fluctuation patterns identified from the calculated performance differential report, wherein the interactive visual element corresponding to the at least one anomalous data fluctuation pattern includes a distinctive visual marking.

In some implementations, the alphanumeric responses of the alphanumeric response set include content elements corresponding to portions of at least one reference performance differential report. In some implementations, the method can include causing the generative machine learning model to generate the response to the received natural-language query based, at least in part, on the at least one reference performance differential report and the calculated performance differential report.

In some implementations, the method can include retrieving a validation parameter set indicating compliance requirements for the structured alphanumeric signals of digital artifacts associated with the monitored system. In some implementations, the method can include responsive to determining, using the retrieved validation parameter set, at least one validation parameter not satisfied by an alphanumeric signal subset of the first digital artifact set, identifying at least one error resolution record including: (1) an anomalous alphanumeric signal indicating similar contents to the alphanumeric signal subset and failing to satisfy the at least one validation parameter, and (2) an adjusted signal format enabling the anomalous alphanumeric signal to satisfy the at least one validation parameter. In some implementations, the method can include modifying, using a machine learning model, the alphanumeric signal subset of the first digital artifact set to match the adjusted signal format of the identified at least one error resolution record.

In some implementations, the method can include accessing a validation model set, each validation model configured to evaluate compliance of structured alphanumeric signals to a parameter subset of the validation parameter set. In some implementations, the method can include, for each validation parameter of the validation parameter set, identifying, from the validation model set, at least one validation model configured to evaluate compliance of structured alphanumeric signals for the validation parameter. In some implementations, the method can include predicting, using the at least one validation model, a compliance label for the structured alphanumeric signals of the first digital artifact set.

In some implementations, the method can include receiving, from the user interface, user feedback data including at least one adjustment to contents of the generated response to the natural-language query. In some implementations, the method can include retraining the generative machine learning model based on the received natural-language query, the generated response to the natural-language query, and the at least one adjustment to contents of the generated response.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method for a signal evaluation platform, the method comprising:
   receiving, via a user interface, a natural-language query for information associated with a first digital artifact set of a monitored system, at least one first digital artifact of the first digital artifact set comprising structured alphanumeric signals indicating performance characteristics of the monitored system at a first time interval;
   retrieving a second digital artifact set mapped to the first digital artifact set, at least one second digital artifact comprising structured alphanumeric signals indicating prior performance characteristics of the monitored system at a second time interval prior to the first time interval;
   calculating, using alphanumeric signals of the first and the second digital artifact sets, a performance differential report indicating change in one or more operational performance characteristics from the first digital artifact set to the second digital artifact set;
   determining, using the received natural-language query, at least one historical dialogue record comprising:
      (1) a natural-language query set indicating prior request for information associated with one or more digital artifacts of the monitored system, at least one natural-language query of the natural-language query set satisfying a similarity threshold in comparison to the received natural-language query, and
      (2) a corresponding alphanumeric response set indicating prior formatted responses to one or more natural-language queries of the natural-language query set;
   inputting the calculated performance differential report and the at least one historical dialogue record into a generative machine learning model to generate a narrative response to the received natural-language query; and
   transmitting, for display at the user interface, the generated narrative response to the received natural-language query.

2. The computer-implemented method of claim 1, further comprising:
   identifying, from the calculated performance differential report, one or more data fluctuation patterns between the structured alphanumeric signals of the first and the second digital artifact sets;
   retrieving a supplementary alphanumeric signal set corresponding to user-validated human-readable narratives describing data fluctuation patterns identified within prior performance differential reports;
   causing the generative machine learning model to generate, using the supplementary alphanumeric signal set, a supplemental narrative response describing the identified fluctuation patterns of the performance differential report; and
   transmitting, for display at the user interface, the supplemental narrative response alongside the generated response to the received natural-language query.

3. The computer-implemented method of claim 2, further comprising:
   receiving, from the user interface, a user-validated narrative describing the identified data fluctuation patterns of the calculated performance differential report; and
   configuring the generative machine learning model to generate the supplementary narrative response based, at least in part, on the received user-validated narrative.

4. The computer-implemented method of claim 2, wherein the one or more data fluctuation patterns of the performance differential report comprises at least one anomalous data fluctuation pattern that fails to satisfy a tolerance threshold, and wherein the method further comprises:
   retrieving anomalous signal records for prior performance differential reports, at least one record comprising:
      (1) a recorded data fluctuation pattern similar to the at least one anomalous data fluctuation pattern of the calculated performance differential report, and
      (2) at least one identified source of the recorded data fluctuation pattern within the digital artifacts used to generate the prior performance differential reports;
   identifying, using a machine learning model, one or more candidate sources of the at least one anomalous data fluctuation pattern within the first and the second digital artifact set based on the retrieved anomalous signal records; and
   transmitting, for display at the user interface, the identified one or more candidate sources of the at least one anomalous data fluctuation pattern.

5. The computer-implemented method of claim 4, wherein the at least one anomalous data fluctuation pattern of the calculated performance differential report comprises a resource expenditure, a resource allocation, a risk assessment, an asset indemnity, comparative constants for performance metrics, or a combination thereof.

6. The computer-implemented method of claim 4, further comprising:
   transmitting, for display at the user interface, a hierarchical map of interactive visual elements corresponding to the one or more data fluctuation patterns identified from the calculated performance differential report,
      wherein the interactive visual element corresponding to the at least one anomalous data fluctuation pattern comprises a distinctive visual marking.

7. The computer-implemented method of claim 1, wherein the alphanumeric responses of the alphanumeric response set comprise content elements corresponding to portions of at least one reference performance differential report, and wherein the method further comprises:
   causing the generative machine learning model to generate the response to the received natural-language query based, at least in part, on the at least one reference performance differential report and the calculated performance differential report.

8. The computer-implemented method of claim 1, further comprising:
   retrieving a validation parameter set indicating compliance requirements for the structured alphanumeric signals of digital artifacts associated with the monitored system;
   responsive to determining, using the retrieved validation parameter set, at least one validation parameter not satisfied by an alphanumeric signal subset of the first digital artifact set, identifying at least one error resolution record comprising:
      (1) an anomalous alphanumeric signal indicating similar contents to the alphanumeric signal subset and failing to satisfy the at least one validation parameter, and
      (2) an adjusted signal format enabling the anomalous alphanumeric signal to satisfy the at least one validation parameter; and
   modifying, using a machine learning model, the alphanumeric signal subset of the first digital artifact set to match the adjusted signal format of the identified at least one error resolution record.

9. The computer-implemented method of claim 8, further comprising:
accessing a validation model set, at least one validation model configured to evaluate compliance of structured alphanumeric signals to a parameter subset of the validation parameter set; and
for at least one validation parameter of the validation parameter set:
identifying, from the validation model set, at least one validation model configured to evaluate compliance of structured alphanumeric signals for the validation parameter; and
predicting, using the at least one validation model, a compliance label for the structured alphanumeric signals of the first digital artifact set.

10. The computer-implemented method of claim 1, further comprising:
receiving, from the user interface, user feedback data comprising at least one adjustment to contents of the generated response to the natural-language query; and
retraining the generative machine learning model based on the received natural-language query, the generated response to the natural-language query, and the at least one adjustment to contents of the generated response.

11. A non-transitory, computer-readable storage medium comprising instructions recorded thereon, wherein the instructions when executed by at least one data processor of a system, cause the system to:
receive, via a user interface, a query for information associated with a first digital artifact set of a monitored system, at least one first digital artifact of the first digital artifact set comprising structured alphanumeric signals indicating performance characteristics of the monitored system at a first time interval;
retrieve a second digital artifact set mapped to the first digital artifact set, at least one second digital artifact comprising structured alphanumeric signals indicating prior performance characteristics of the monitored system at a second time interval prior to the first time interval;
calculate, using alphanumeric signals of the first and the second digital artifact sets, a performance differential report indicating change in one or more operational performance characteristics from the first digital artifact set to the second digital artifact set;
determine, using the received query, at least one historical record comprising:
(1) a prior query set indicating prior request for information associated with one or more digital artifacts of the monitored system, at least one prior query of the prior query set satisfying a similarity threshold in comparison to the received query, and
(2) a corresponding response set indicating prior responses to one or more prior queries of the prior query set;
input the calculated performance differential report and the at least one historical record into a generative machine learning model to generate a narrative response to the received query; and
transmit, for display at the user interface, the generated narrative response to the received query.

12. The non-transitory, computer-readable storage medium of claim 11, wherein the instructions further cause the system to:
identify, from the calculated performance differential report, one or more data fluctuation patterns between the structured alphanumeric signals of the first and the second digital artifact sets;
retrieve a supplementary alphanumeric signal set corresponding to user-validated human-readable narratives describing data fluctuation patterns identified within prior performance differential reports;
cause the generative machine learning model to generate, using the supplementary alphanumeric signal set, a supplemental narrative response describing the identified fluctuation patterns of the performance differential report; and
transmit, for display at the user interface, the supplemental narrative response alongside the generated response to the received query.

13. The non-transitory, computer-readable storage medium of claim 11, wherein the alphanumeric responses of the alphanumeric response set comprise content elements corresponding to portions of at least one reference performance differential report, and wherein the instructions further cause the system to:
cause the generative machine learning model to generate the response to the received query based, at least in part, on the at least one reference performance differential report and the calculated performance differential report.

14. The non-transitory, computer-readable storage medium of claim 11, wherein the instructions further cause the system to:
retrieve a validation parameter set indicating compliance requirements for the structured alphanumeric signals of digital artifacts associated with the monitored system;
responsive to determining, using the retrieved validation parameter set, at least one validation parameter not satisfied by an alphanumeric signal subset of the first digital artifact set, identifying at least one error resolution record comprising:
(1) an anomalous alphanumeric signal indicating similar contents to the alphanumeric signal subset and failing to satisfy the at least one validation parameter, and
(2) an adjusted signal format enabling the anomalous alphanumeric signal to satisfy the at least one validation parameter; and
modifying, using a machine learning model, the alphanumeric signal subset of the first digital artifact set to match the adjusted signal format of the identified at least one error resolution record.

15. The non-transitory, computer-readable storage medium of claim 11, wherein the instructions further cause the system to:
receive, from the user interface, user feedback data comprising at least one adjustment to contents of the generated response to the query; and
retrain the generative machine learning model based on the received query, the generated response to the query, and the at least one adjustment to contents of the generated response.

16. A system comprising:
at least one hardware processor; and
at least one non-transitory memory storing instructions, which, when executed by the at least one hardware processor, cause the system to:
receive a query for information associated with a first digital artifact set of a monitored system, at least one first digital artifact of the first digital artifact set comprising structured alphanumeric signals indicating performance characteristics of the monitored system at a first time interval;

retrieve a second digital artifact set mapped to the first digital artifact set, at least one second digital artifact comprising structured alphanumeric signals indicating prior performance characteristics of the monitored system at a second time interval prior to the first time interval;

calculate, using alphanumeric signals of the first and the second digital artifact sets, a performance differential report indicating change in one or more operational performance characteristics from the first digital artifact set to the second digital artifact set;

determine, using the received query, at least one historical record comprising:
(1) a prior query set indicating prior request for information associated with one or more digital artifacts of the monitored system, at least one prior query of the prior query set satisfying a similarity threshold in comparison to the received query, and
(2) a corresponding response set indicating prior responses to one or more prior queries of the prior query set;

input the calculated performance differential report and the at least one historical record into a generative machine learning model to generate a narrative response to the received query; and transmit the generated narrative response to the received query.

17. The system of claim 16 further caused to:

identify, from the calculated performance differential report, one or more data fluctuation patterns between the structured alphanumeric signals of the first and the second digital artifact sets;

retrieve a supplementary alphanumeric signal set corresponding to user-validated human-readable narratives describing data fluctuation patterns identified within prior performance differential reports;

cause the generative machine learning model to generate, using the supplementary alphanumeric signal set, a supplemental narrative response describing the identified fluctuation patterns of the performance differential report; and transmit the supplemental narrative response alongside the generated response to the received query.

18. The system of claim 16, wherein the alphanumeric responses of the alphanumeric response set comprise content elements corresponding to portions of at least one reference performance differential report, and wherein the system is further caused to:

cause the generative machine learning model to generate the response to the received query based, at least in part, on the at least one reference performance differential report and the calculated performance differential report.

19. The system of claim 16 further caused to:

retrieve a validation parameter set indicating compliance requirements for the structured alphanumeric signals of digital artifacts associated with the monitored system;

responsive to determining, using the retrieved validation parameter set, at least one validation parameter not satisfied by an alphanumeric signal subset of the first digital artifact set, identifying at least one error resolution record comprising:
(1) an anomalous alphanumeric signal indicating similar contents to the alphanumeric signal subset and failing to satisfy the at least one validation parameter, and
(2) an adjusted signal format enabling the anomalous alphanumeric signal to satisfy the at least one validation parameter; and modifying, using a machine learning model, the alphanumeric signal subset of the first digital artifact set to match the adjusted signal format of the identified at least one error resolution record.

20. The system of claim 16 further caused to:

receive user feedback data comprising at least one adjustment to contents of the generated response to the query; and retrain the generative machine learning model based on the received query, the generated response to the query, and the at least one adjustment to contents of the generated response.

* * * * *